US009209979B2

(12) United States Patent
Spiers et al.

(10) Patent No.: US 9,209,979 B2
(45) Date of Patent: *Dec. 8, 2015

(54) SECURE NETWORK CLOUD ARCHITECTURE

(71) Applicant: Bank of America Corporation, Charlotte, NC (US)

(72) Inventors: Bradford Thomas Spiers, Bedminster, NJ (US); Miroslav Halas, Charlottesville, VA (US); Richard A. Schimmel, Glenmont, NY (US); Donald P. Provencher, Clifton Park, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,849

(22) Filed: Jul. 1, 2014

(65) Prior Publication Data

US 2014/0331309 A1 Nov. 6, 2014

Related U.S. Application Data

(63) Continuation of application No. 13/422,729, filed on Mar. 16, 2012, now Pat. No. 8,799,997.

(60) Provisional application No. 61/492,612, filed on Jun. 2, 2011, provisional application No. 61/476,747, filed on Apr. 18, 2011.

(51) Int. Cl.
*H04L 29/06* (2006.01)
*H04L 9/32* (2006.01)
*H04L 29/08* (2006.01)
(Continued)

(52) U.S. Cl.
CPC .......... *H04L 9/3247* (2013.01); *G06F 9/45533*
(2013.01); *G06F 21/575* (2013.01); *H04L 9/28*
(2013.01); *H04L 9/3234* (2013.01); *H04L
63/0218* (2013.01); *H04L 63/0281* (2013.01);
*H04L 63/0428* (2013.01);
(Continued)

(58) Field of Classification Search
None
See application file for complete search history.

(56) References Cited

U.S. PATENT DOCUMENTS 7,146,305 B2 12/2006 van der Made
7,207,039 B2 4/2007 Komarla et al.
(Continued)

FOREIGN PATENT DOCUMENTS

CN 102033755 A 4/2011
EP 1761837 A1 3/2007
(Continued)

OTHER PUBLICATIONS

Final Office Action received in corresponding U.S. Appl. No. 13/422,713 mailed on Jul. 3, 2014.
(Continued)

*Primary Examiner* — Jeffery Williams
(74) *Attorney, Agent, or Firm* — Banner & Witcoff, Ltd.; Michael A. Springs

(57) ABSTRACT

Apparatuses, computer readable media, methods, and systems are described for requesting creation of virtual machine (VM) in a cloud environment comprising a virtual private cloud. Through various communications between a cloud DMZ, cloud provider, and/or company's network, a VM instance may be securely created, initialized, booted, unlocked, and/or monitored through a series of interactions building, in some examples, upon a root of trust.

33 Claims, 15 Drawing Sheets

(51) Int. Cl.
  *G06F 21/57* (2013.01)
  *H04L 9/28* (2006.01)
  *G06F 9/455* (2006.01)

(52) U.S. Cl.
  CPC ............ *H04L 63/08* (2013.01); *H04L 63/0876* (2013.01); *H04L 63/1441* (2013.01); *H04L 67/10* (2013.01)

(56) References Cited

U.S. PATENT DOCUMENTS

| | | |
|---|---|---|
| 7,805,375 B2 | 9/2010 | Fox et al. |
| 7,849,462 B2 | 12/2010 | Traut et al. |
| 7,870,153 B2 | 1/2011 | Croft et al. |
| 2005/0005096 A1 | 1/2005 | Miller |
| 2005/0149716 A1 | 7/2005 | Nair et al. |
| 2005/0251857 A1 | 11/2005 | Schunter et al. |
| 2006/0155674 A1 | 7/2006 | Traut et al. |
| 2007/0180448 A1 | 8/2007 | Low et al. |
| 2008/0046548 A1 | 2/2008 | Doran et al. |
| 2008/0082680 A1 | 4/2008 | Grewal et al. |
| 2008/0201414 A1 | 8/2008 | Amir Husain et al. |
| 2009/0169012 A1 | 7/2009 | Smith et al. |
| 2009/0204964 A1 | 8/2009 | Foley et al. |
| 2009/0260007 A1 | 10/2009 | Beaty et al. |
| 2010/0027552 A1 | 2/2010 | Hill |
| 2010/0082991 A1 | 4/2010 | Baldwin et al. |
| 2010/0169497 A1 | 7/2010 | Klimentiev et al. |
| 2010/0198972 A1 | 8/2010 | Umbehocker |
| 2010/0223610 A1 | 9/2010 | Dehaan et al. |
| 2010/0257523 A1 | 10/2010 | Frank |
| 2010/0322255 A1 | 12/2010 | Hao et al. |
| 2011/0099548 A1 | 4/2011 | Shen et al. |
| 2011/0145821 A1 | 6/2011 | Philipson et al. |
| 2011/0293097 A1 | 12/2011 | Maino et al. |
| 2011/0296201 A1 | 12/2011 | Monclus et al. |
| 2011/0302400 A1 | 12/2011 | Maino et al. |
| 2011/0302415 A1 | 12/2011 | Ahmad et al. |
| 2012/0017271 A1 | 1/2012 | Smith et al. |
| 2012/0054486 A1 | 3/2012 | Lakkavalli et al. |
| 2012/0151209 A1 | 6/2012 | Visnyak et al. |
| 2013/0124600 A1 | 5/2013 | Jaroker |
| 2013/0290694 A1 | 10/2013 | Civilini et al. |

FOREIGN PATENT DOCUMENTS

| | | |
|---|---|---|
| JP | 2007081014 A | 3/2007 |
| WO | 2006011943 A1 | 2/2006 |

OTHER PUBLICATIONS

Siqin Zhao, et al. "The Application of Virtual Machines on System Security," 2009 Fourth ChinaGrid Annual Conference, DOI 10.1109/ChinaGrid 2009.45, Sep. 2009, pp. 222-229.
Notice of Allowance and Fees Due dated Jul. 30, 2014 in U.S. Appl. No. 13/422,732.
Mar. 12, 2015 (US) Non-Final Office Action—U.S. Appl. No. 14/305,611.
Cabuk, et al., "Towards automated security policy enforcement in multi-tenant virtual data centers", 2010, J. Comput. Secur. 18, 1 (Jan. 2010), 89-121.
Jansen, et al., "Policy enforcement and compliance proofs for Xen v virtual machines," In Proceedings of the fourth ACM SIGPLAN/SIGOPS international conference on Virtual execution environments (VEE '08). 2008, ACM, New York, NY, USA, 101-110.
Cabuk, et al., "Towards automated provisioning of w secure virtualized networks". In Proceedings of the 14th ACM conference on Computer and communications security (CCS '07). ACM, New York, NY, USA, 235-245.
BitVisor: A Thin Hypervisor for Enforcing 1/0 Device Security, Takahiro Shinagawa, et al., VEE'09, Mar. 11-13, 2009, © 2009, pp. 121-130.
Patentability Search Report prepared by Mogambo Solutions, Basic Patentability, Transmitting an Operating System Image Template between Computer Systems, Aug. 18, 2011, 9 pages.
Overshadow: A Virtualization-Based Approach to Retrofitting Protection in Commodity Operating Systems, Xiaoxin Chen, et al., ASPLOS'08, Mar. 1-5, 2008, © 2008, 12 pages.
Rapid Trust Establishment for Pervasive Personal Computing, Ajay Surie, et al., Published by the IEEE Computer Society,© 2007, pp. 24-30.
SoftUDC: A Software-Based Data Center for Utility Computing, Mahesh Kallahalla, et al., Published by the IEE Computer Society, © 2004, pp. 38-46.
Subverting Vista™ Kernel for Fun and Profit, Joanna Rutkowska, Advanced Malware Labs, COESEINC, © SyScan'06, Jul. 21, 2006, Singapore and Black Hat Briefings 2006, Aug. 3, 2006, Las Vegas, 52 page.
Attack, solution and verification for shared authorisation data in TCG TPM, Liqun Chen, et al., HP Labs, UK and University of Birmingham, UK, Undated, 17 pages.
The future of cloud computing—Part 1: Recent history, Terrence Lillard, Sep. 5, 2011, http://www.eetimes.com/General/PrintView/4219629, downloaded Dec. 27, 2011, 6 pages.
The future of cloud computing—Part 2: Current and next phases, Terrence Lillard, Sep. 19, 2011, http://www.eetimes.com/Generai/PrintView/4227429, downloaded Dec. 27, 2011, 8 pages.
gPXE Secure Network Booting Project Proposal, http:f/etherboot.org/wiki/soc/derekpryor-proposal, downloaded Jan. 3, 2012, 1 page.
Etherboot image types, http:f/etherboot.org/wiki/eb_imagetypes, downloaded Jan. 3, 2012, 6 pages.
A typical network boot scenario, http://etherboot.org/wiki/scenario, downloaded Jan. 3, 2012 1 page.
SafeBootMode, http://etherboot.org/wiki/safebootmode, downloaded Jan. 3, 2012, 2 pages.
Flicker: Minimal TCB Code Execution, Jonathan M. McCune, Carnegie Mellon University, Mar. 27, 2008, 62 pages.
iPXE, http:f/ipxe.org/start, downloaded Jan. 3, 2012, 2 pages.
PowerPoint, Introduction to Network Booting Free Yourself From Your Hard Drive!, Joshua Oreman, Student Information Processing Board Massachusetts Institute of Technology, Independent Activities Period, Jan. 6, 2010, 27 pages.
HTTP booting and initramfs assembly, http:f/etherboot.org/wiki/screenshots, downloaded Nov. 4, 2012, 4 pages.
TCG PC Client Specific Implementation Specification for Conventional BIOS, Version 1.20 FINAL, Revision 1.00, Jul. 13, 2005 for TPM Family 1.2: Level 2, © 2005 Trusted Computing Group, Incorporated, 119 pages.
Privacy CA, Sample Source Code, Undated, 4 pages.
Trusted Computing: TCG proposals, Computer Society lecture notes, © 2006, Tien Tuan Anh Dinh et al., updated Nov. 4, 2006, 7 pages.
Trusted Platform on demand (TPod), Hiorshi Maruyama, et al., Feb. 1, 2004, 13 pages.
vTPM: Virtualizing the Trusted Platform Module, Stefan Berger, et al., IBM T.J. Watson Research Center, US EN IX Association, Security '06: 15th Usenix Security Symposium, pp. 305-320.
Research and Design of Full Disk Encryption Based on Virtual Machine, Min Ling et al., © 2010 IEEE, pp. 642-646.
Symerton—Using Virtualization to Accelerate Packet Processing, Aaron R. Kunze, et al., ANCS'06, Dec. 3-5, 2006, pp. 133-142.
PowerPoint Symerton—Using Virtualization to Accelerate Packet Processing, Aaron R. Kunze, et al., Communications Technology Lab Corporate Technology Group, Dec. 4, 2006, 21 pages.
iPXE, http://en.wikipedia.org/wiki!IPXE, downloaded Jan. 2, 2012, 2 pages.
NIST Special Publication 800-145, The NIST Definition of Cloud Computing, Recommendations of the National Institute of Standards and Technology, Peter Melland Timothy Grance, Ntional Institute of Standards and Technology, Sep. 2011, 7 pages.
Intel® Trusted Execution Technology: A Primer, Matthew Gillespie, dated Jun. 1, 2009, http://software.intel.com/en-us-articles/intel-trusted-execution-technology-a-primer, downloaded Feb. 1, 2012, 4 pages.

(56) References Cited

OTHER PUBLICATIONS

Non-Final Office Aciton dated Mar. 19, 2013 in U.S. Appl. No. 13/422,751.

PCT International Search Report mailed Jun. 27, 2012, Application No. PCT/US 2012-33992, 15 pages.

Verizon Technical Solutions Paper, Computing as a Service—Securing our Enterprise Class Cloud,© 2010 Verizon, 8 pages.

PCT International Search Report dated Jul. 5, 2012, International Application No. PCT/US 2012-34052, 18 pages.

SECURE NETWORK CLOUD ARCHITECTURE

CROSS REFERENCE TO RELATED APPLICATIONS

This application is a continuation of U.S. patent application Ser. No. 13/422,729, entitled "Secure Network Cloud Architecture," filed Mar. 16, 2012, which claims the benefit of, and priority to, U.S. Provisional Patent Application No. 61/492,612, entitled "Hardware-Based Root of Trust for Multitenant Cloud Environments," filed Jun. 2, 2011, and U.S. Provisional Patent Application No. 61/476,747, entitled "IAAS Cloud Architecture," filed Apr. 18, 2011. Each of the foregoing applications is incorporated herein by reference in their entirety

BACKGROUND

Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided. Cloud computing, however, may present issues with information security and integrity. Use of cloud computing requires trusting the computers that make up the cloud, the network with which the cloud is connected, the individuals and organizations that operate the cloud, and the physical environment in which cloud resources are placed. Trusting these computers in existing clouds, however, is not an acceptable risk for many.

Another known concept is remote-access clients. A company may already have laptops used by its employees via remote access architecture such as a virtual private network (VPN). In such architecture, the result may be a trusted software image running in an untrusted environment connecting back to the company. However, such a prior art architecture is insufficient in various respects for many companies' needs.

Another known concept may be to trust a hypervisor given to a cloud tenant by its cloud provider. Though not technically secure, the tenant may create trust via contractual obligation with the cloud provider. This may be analogous to trusting an outside vendor with the tenant's networks, for example, which various companies already do today. However, such contractual arrangements may be insufficient in various respects for many companies.

In addition, prior art describe systems which allow the booting of machines on non-secure networks, as well as the possibility of booting from a server not within the local network. Such systems may use Safebootmode features to assure that no bogus trivial file transfer protocol (TFTP) servers on the network can supply boot files that might present a rogue login screen to capture a password. However, such systems do not address verification of the authenticity of the clients requesting the boot, if the clients are supposed to boot in automated fashion in an untrusted environment.

In addition, an open source network boot firmware may offer systems that provide a preboot execution environment (PXE) implementation enhanced with additional features. Different from a traditional PXE ROM, open source network boot firmware may be able to boot over a wide area network (WAN) such as the Internet. If the machine being tested is connected to the Internet, the open source network boot firmware demonstration image may be booted.

In view of such issues, improvements in cloud computing environments are needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of example embodiments, apparatuses, computer readable media, methods, and systems are described for creating a trusted cloud environment in which a virtual machine may be instantiated, loaded, booted, and utilized. In one example, a method is disclosed comprising: transmitting over a secure channel (e.g., HTTPS, SSH protocols using SSL/TLS technology, VPN, and the like) a first token (e.g., a single-use software token) and instructing/requesting the cloud provider to create/initialize a new virtual machine; recording the first token in association with the request for a virtual machine or a reservation; receiving the first token after a second computing system requests to load components used to initialize the operating system (OS) boot process (e.g., an operating system kernel and an initial ramdisk); confirming (e.g., comparing) the authenticity of the first token; transmitting a second token and unique components to initialize the OS boot process; recording the second token in association with the request for a virtual machine or the reservation; receiving the second token after the second computing system has booted the new virtual machine using the components (e.g., an operating system kernel and initial ramdisk, an encrypted operating system image template, or other components delivered (e.g., push or pull) over a secure channel); confirming (e.g., comparing) the authenticity of the second token; creating a secure channel between the trusted server and the delivered OS components, where the channel is authenticated using (possibly unique) authentication tokens delivered alongside the OS components; transmitting, over the newly created secure/authenticated channel, a third token and confidential information (e.g., passwords, digital certificates, unique token, and the like) configured to enable the virtual machine to establish a secure (e.g., encrypted, VPN connection) channel between the first computing system and the new virtual machine via a gateway server; recording the third token in association with the request for a virtual machine or the reservation; receiving the third token and a request to establish a secure connection with the virtual machine; confirming (e.g., comparing) the authenticity of the third token; and/or monitoring operation and communications associated with the new virtual machine once the boot/startup process is complete (e.g., once the secure channel is initialized and the VM is loading the remaining OS components and/or applications for operation and data processing. One or more of the aforementioned steps of the disclosed method may be optional, omitted, and/or performed in an order different than recited above. In addition, in some examples, the second computing system may store an encrypted operating system image template, and an encrypted channel may be created using secure (e.g., HTTPS) communication between the first computing system and the second computing system. In some examples, the virtual machine may be a measured virtual machine, and the authenticity of the virtual machine may be determined using a quote generated based on a measurement of the measured virtual machine. The quote may comprise a key of a trusted module. In some examples, the first computing system may be associated with an organization and the second computing system may be associated with a cloud service provider that provides cloud computing services to the organization. In some example, the first token, second token, third token, and/or other unique data elements may be randomly generated for one-time (e.g., limited) use.

In another example, a computing apparatus is disclosed comprising one or more processors and one or more memories (e.g., tangible, non-transitory computer memory) storing computer executable instructions that, when executed, cause the apparatus to perform one or more of the aforementioned steps: One or more of the aforementioned steps of the disclosed method may be optional, omitted, and/or performed in an order different than recited above. In addition, in some examples, the virtual machine may be located in a cloud environment (e.g., virtual private cloud), while the aforementioned apparatus may be located inside an organization's network and may communicate with the computing cloud. Moreover, the secure cloud zone may comprise: one or more firewalls (e.g., internal firewall, external firewall, and the like), a secure boot server, cloud orchestrator system (e.g., cloud orchestrator client and/or server) and/or other devices.

In yet another example, a method is disclosed comprising: receiving, from a virtual machine, a request to download components configured to boot the virtual machine, wherein the request includes at least a first token; transmitting, to a first computing system, the first token; receiving, from the first computing system, a second token indicating authorization to transmit unique components to the virtual machine in response to the request to download components; generating unique components comprising unique network address and configuration settings; transmitting, to the virtual machine, the unique components and the second token; receiving, from the virtual machine, a third token and confidential information (e.g., secret passphrase, and the like) indicating authorization from the first computing system to create a secure channel with the virtual machine; transmitting, to the first computing system, the third token; and/or establishing the secure channel between the virtual machine and the first computing system. One or more of the aforementioned steps of the disclosed method may be optional, omitted, and/or performed in an order different than recited above.

In addition, apparatuses, computer readable media, and systems are contemplated implementing one or more of the aforementioned steps described herein. For example, a system is disclosed herein comprising a secure cloud zone, a virtual private cloud, and/or an organization computer network. In some examples, the secure cloud zone (e.g., cloud DMZ) may comprise one or more of: an internal firewall; external firewall; secure boot server; gateway server; and/or cloud orchestrator system. Also, in some examples, the cloud environment (e.g., virtual private cloud) may comprise one or more of: virtual machines configured to be securely booted by a secure boot server; and/or encrypted operating system image template configured for use in creating a virtual machine as a clone of the template. In addition, in some examples, the organization computer network may comprise one or more of: a cloud orchestrator system; a firewall; and/or a data store (e.g., internal database). In some examples, the organization computer network may be located completely outside of the cloud computing system. In another example, the organization computer network and cloud DMZ may utilize a co-location concept such that various devices (e.g., cloud orchestrator) identified in this disclosure as being on one network may be co-located on the other network in accordance with various aspects of the disclosure. One or more of the aforementioned components/devices of the disclosed system may be optional, and/or omitted.

Aspects of the embodiments may be provided in at least one non-transitory computer-readable medium and/or memory storing computer-executable instructions that, when executed by at least one processor, cause a computer or other apparatus to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

This disclosure describes various techniques for creating a trusted environment in an untrusted cloud environment. The trusted environment may form a basis for an illustrative architecture that may allow extending an organization's infrastructure using, e.g., infrastructure as a service (IaaS) cloud resources. The disclosure illustrates a combination of elements (e.g., pieces of hardware and/or software), together with a process in which they are deployed, managed, and operated, that may be used to create a trusted environment in accordance with various aspects of the disclosure. The initial state of the environment may be considered and verified separately as well as all together so that the environment can be trusted (e.g., such that the risks associated with such environment are acceptable for the organization). The initial state of the environment may include internal organization infrastructure 302 (e.g., the hardware and/or software that enables connectivity to the cloud provider facility 304 and cloud demilitarized zone (DMZ) 306), cloud provider infrastructure 304, organization's encrypted operating system (OS) template, and/or an initial empty virtual private cloud (VPC) 308 environment dedicated to the organization. Aspects of the disclosure need not necessarily rely on isolated pieces of hardware or software to individually provide a solution for creating a trusted environment in a virtual private cloud.

Figure 1:
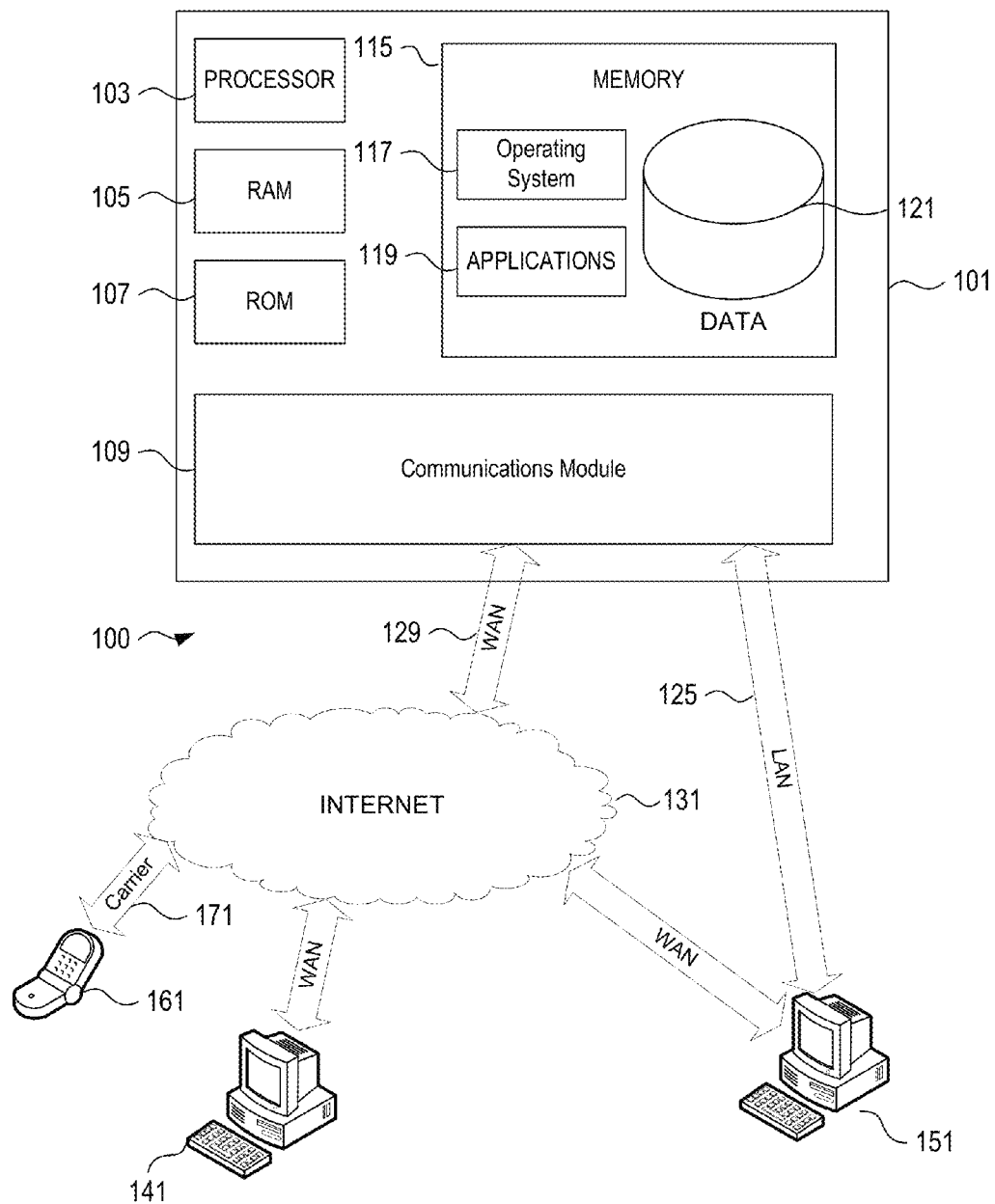
FIG. 1 shows an illustrative operating environment in which various aspects of the present disclosure may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

With reference to FIG. 1, the computing system environment 100 may include a computing device 101 having a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware. Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like to digital files.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device (e.g., smart phone) communicating over wireless carrier channel 171.

The network connections depicted in FIG. 1 may include a local area network (LAN) 125 and a wide area network (WAN) 129, as well as other networks. When used in a LAN networking environment, computing device 101 may be connected to the LAN 825 through a network interface or adapter in the communications module 109. When used in a WAN networking environment, computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
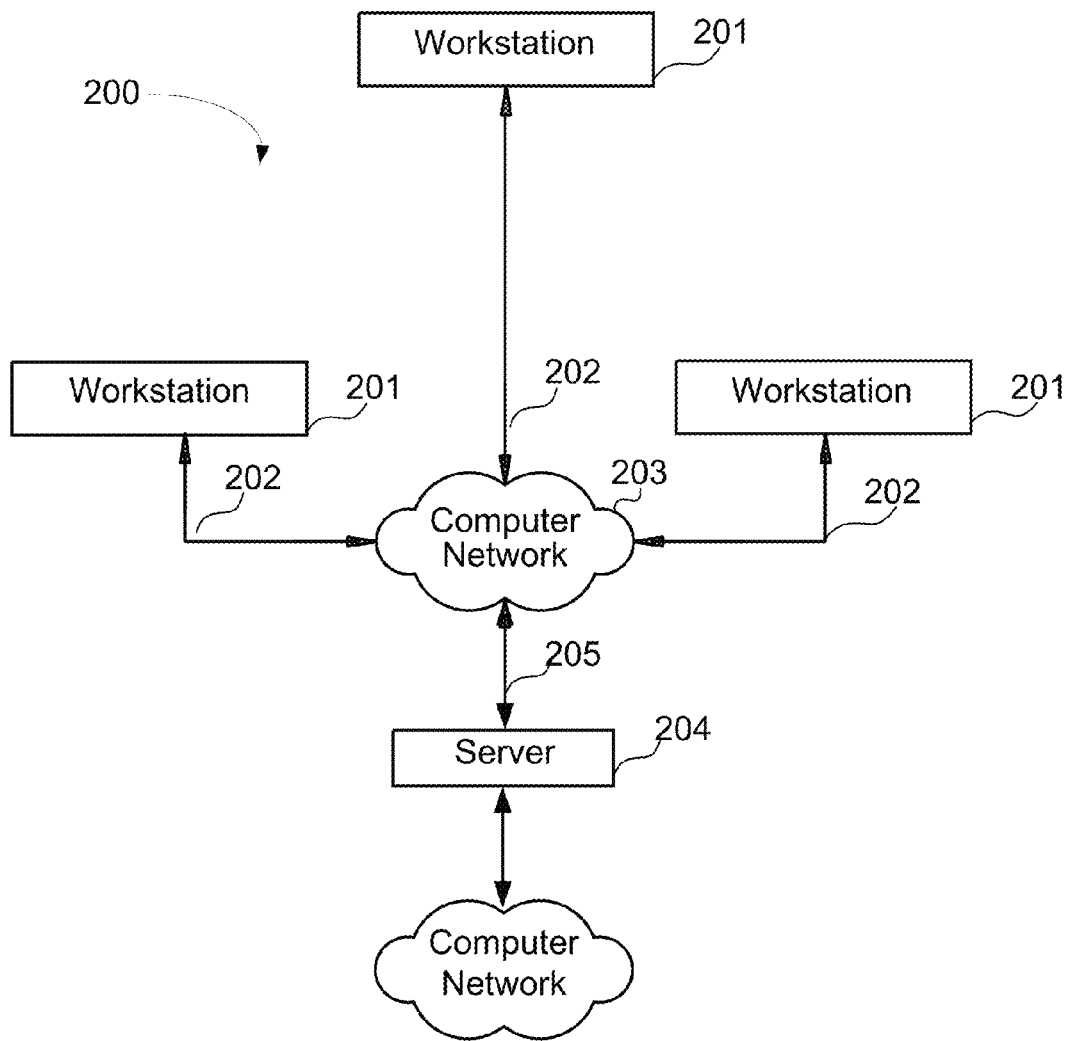
FIG. 2 is an illustrative block diagram of workstations and servers that may be used to implement the processes and functions of certain aspects of the present disclosure in accordance with example embodiments.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

The steps that follow in FIGS. 3-12 may be implemented by one or more of the components in FIGS. 1 and 2 and/or other components, including other computing devices.

Figure 3:
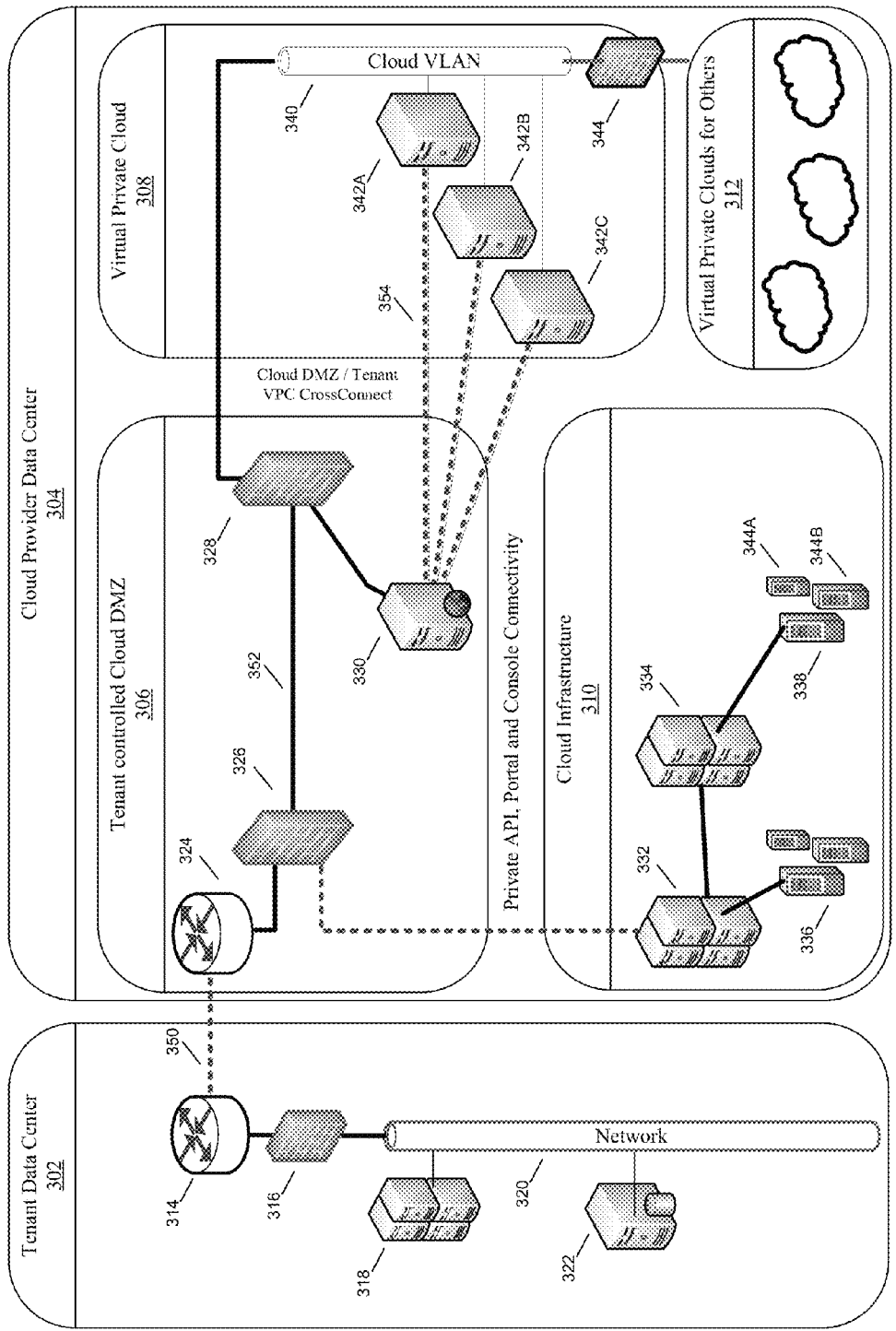
FIGS. 3-5 illustrate example systems for providing hardware-based root of trust in a multitenant cloud environment in accordance with example embodiments.
Figure 4:
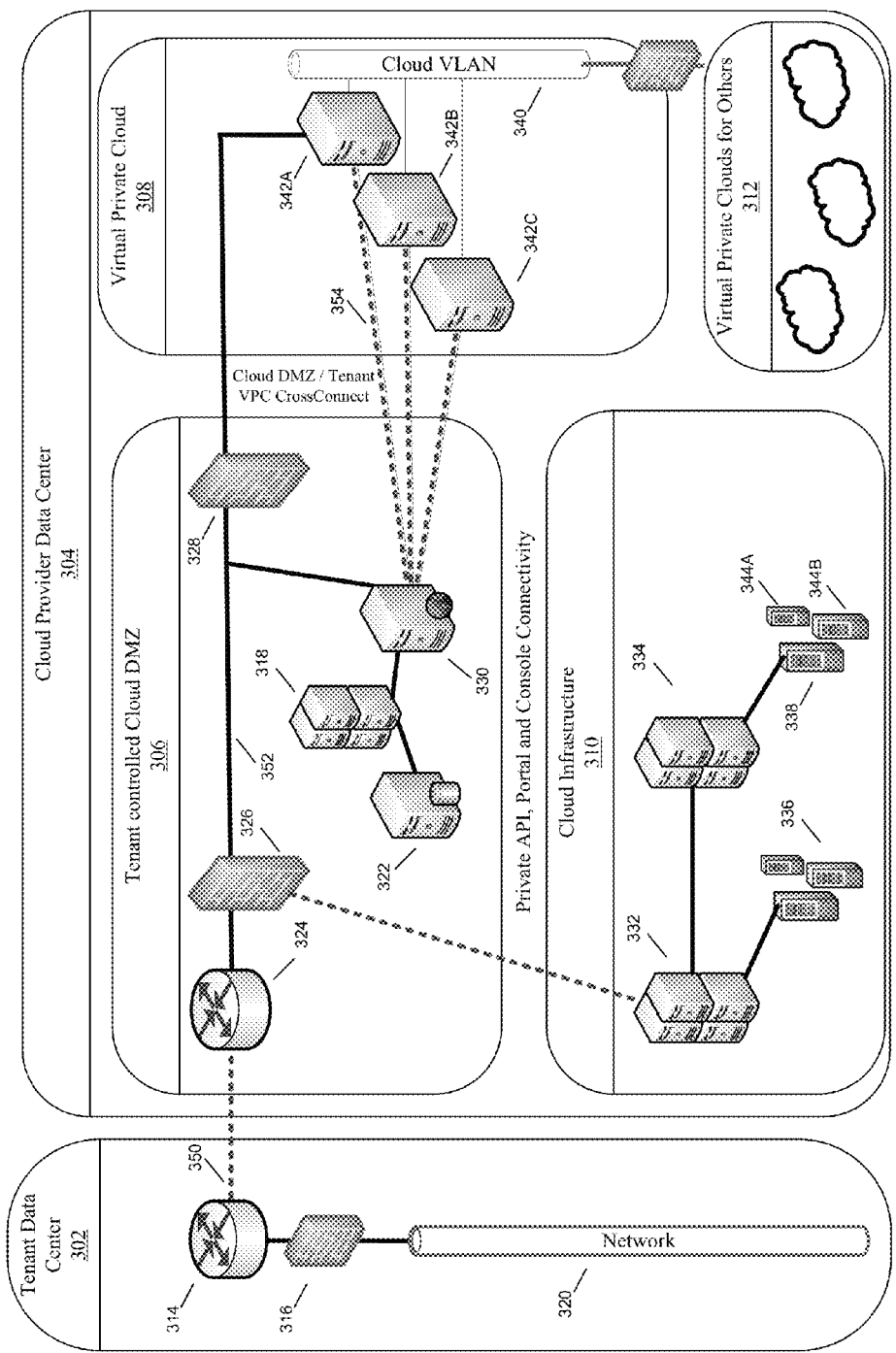
Figure 5:
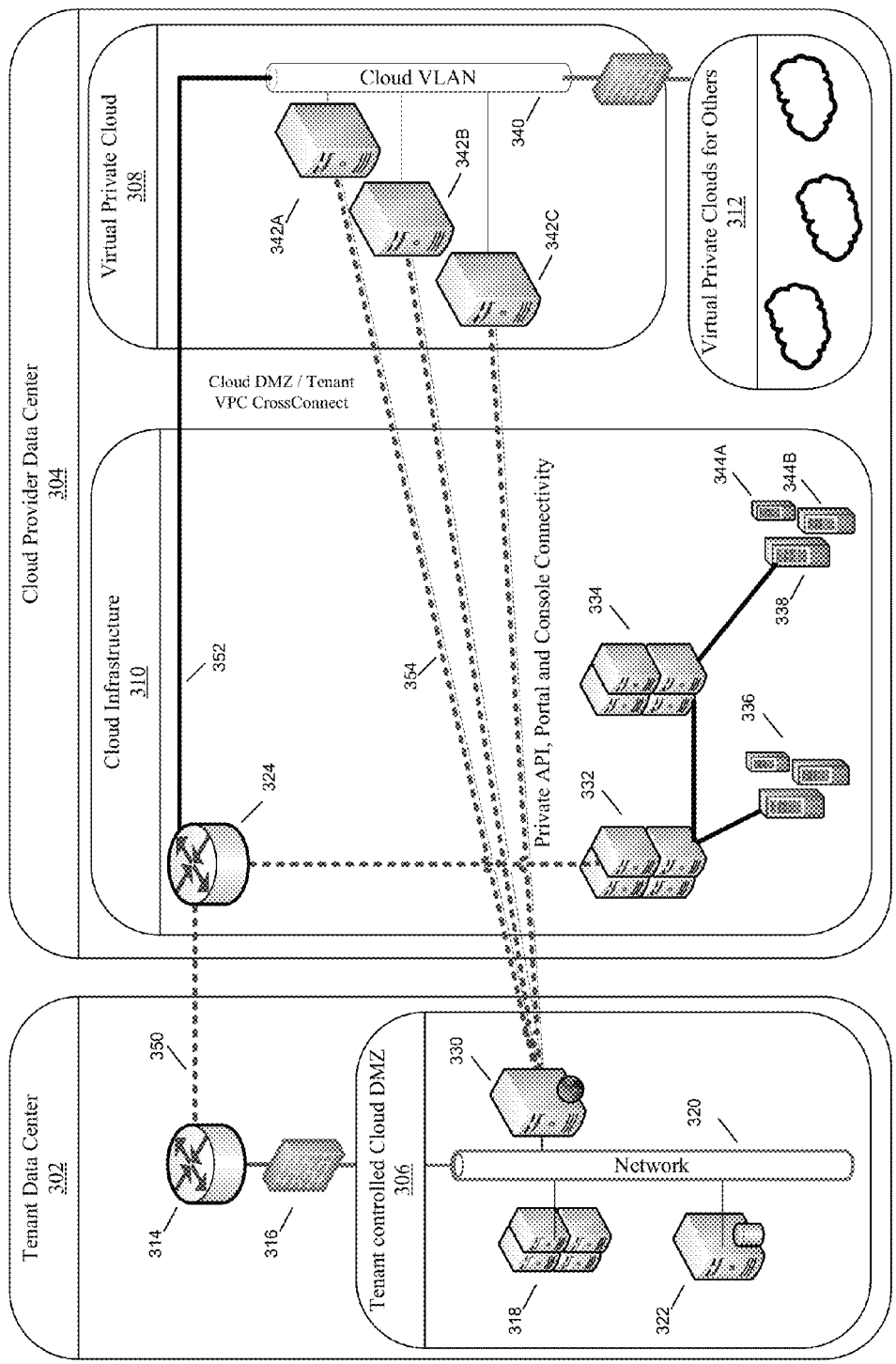

FIGS. 3-5 illustrate example systems providing hardware-based root of trust in a cloud environment in accordance with example embodiments. Hardware-based root of trust may refer to a cloud environment incorporating a trusted piece of hardware within the cloud that a tenant of the cloud may use for remote attestation. Remote attestation may include a process of remotely verifying the integrity and authenticity of cloud infrastructure that provides a virtual machine (VM), thereby permitting the tenant to trust the cloud infrastructure. The example embodiments discussed herein may implement a hardware-based remote attestation protocol in a cloud environment, such as shown in FIGS. 3-5. Trust may be established by verifying the integrity and authenticity of software, configurations, and hardware of a virtualization platform that provides a virtual machine on which the tenant may use to execute a workload. The trusted piece of hardware may create cryptographically signed measurements for validating the integrity and authenticity of the hardware, software, and configurations implementing the virtual machine prior to the tenant providing the workload to the virtual machine for execution.

As an overview, a root of trust has typically been considered a set of unconditionally trusted functions upon which one may rely to always work properly. An unconditionally trusted function may be, for example, a guarantee set forth that the operating system running in a cloud is the authentic system deployed there by an organization, such as a bank or other financial institution, or another type of organization, that can be accessed and used only by an authorized user, and that any networking traffic generated or destined to this system is not eavesdropped on or tampered with. However, in accordance with various aspects of the disclosure, a root of trust may be considered a set of unconditionally trusted functions for which one may be willing to accept some risks associated with them while still being comfortable using them. Prior art technologies, for example in cloud computing and/or virtualization technology, did not provide a solution to establish such an enhanced/modified root of trust in a cloud environment (e.g., virtual private cloud).

In accordance with various aspects of the disclosure, in an absence of hardware-based root of trust in a cloud environment or in addition to hardware-based root of trust in a cloud environment, a root of trust may be established by a combination of one or more of at least the following three steps: (i) ascertaining the initial state of the environment, including both the organization's infrastructure as well as the cloud provider's infrastructure; (ii) monitoring the environment in order to demonstrate that the environment contains only the elements that it is expected to contain and in a state in which they are expected to be; and (iii) modifying the state of the environment in order to create, deploy, bring online, and/or sustain new instances in the cloud.

The initial state of the cloud environment illustrated in FIGS. 3-5, 12A, and 12B may be ascertained through various steps. For example, the equipment, software, and processes used by the cloud provider may be analyzed and verified to be trustworthy and acceptable by an organization's standards. This may include, for example, reviewing the cloud provider's standards and/or processes for password, key management, data handling, data backups, data destructions, deployment of hardware/software infrastructure, operation of hardware/software infrastructure, management of hardware/software infrastructure, and/or decommissioning of hardware/software infrastructure. It may also include, for example, reviewing the cloud provider's network connectivity standards and/or configurations, and verifying or otherwise guaranteeing that the cloud provider is running authentic software (e.g., virtualization platform) which was not tampered with and which is configured properly. The process of establishing a root of trust in the cloud provider's environment may be accomplished by, for example, one or more efforts: assessing service providers using assessment tailored towards cloud providers; negotiating contracts establishing contractual relationship between the organization and the cloud provider including all the obligation and consequences; and/or assessing risk based on the results of the previous two items as well as the elements described in FIGS. 3-5, 12A, and 12B that may be used to access the cloud in order to determine if level of risk posed by factors that are outside of the organization's control are acceptable.

Once the initial state of the cloud environment has been ascertained, the environment may be monitored in order to demonstrate that the environment contains only the elements that it is expected to contain and in a state in which they are expected to be. Monitoring software may be deployed and functions executed to monitor the cloud environment (e.g., virtual private cloud) and the physical infrastructure used to implement it. The monitoring may be performed: internally from within the cloud environment (e.g., virtual private cloud) by the organization using standard and/or newly adopted organization software and methods; and/or externally from the cloud provider environment to provide an independent perspective from the outside of the virtualized environment looking in. Monitoring may provide the capability, at any given moment, to determine what elements, such as virtual instances, are present in the environment, if any of them are behaving improperly (e.g. network address conflicts, running unauthorized server like functions, network address spoofing, and the like), and/or how they are communicating with each other (e.g. to detect unexpected protocols, connections between servers, traffic on unexpected ports) and/or with the cloud DMZ and the organization infrastructure. The output of the monitoring may be used to detect any events that do not conform to a predefined set of constraints as well as trace every element of the environment to its roots (e.g., how it got to the environment). Once a system is in place that generates an alert when it detects any anomalous events, then one may be able to trust that the current state of the environment is exactly as expected.

Once the initial state of the cloud environment has been ascertained and the environment is being monitored, the state of the environment may be modified in order to create, deploy, bring online, and/or sustain new instances in the cloud. In one example, assume, an initial trusted state TS0 of the environment is known, and that a trusted process is known from which the environment in its current trusted state TSn can be expanded with one additional running virtual instance; also, assume that a process is known which can be used to maintain the trust in the running instance. As a result, the process may be used to expand and sustain previously a trusted state of the environment TSn by one running instance and result in a new trusted state of the environment TSn+1. This type of statement is an example of a mathematical induction. Mathematical induction may be used to show that by having the initial trusted state of the environment and by creating, deploying, and sustaining instances in the cloud using the trusted process, the cloud environment which is created can be in fact trusted.

Moreover, ongoing monitoring of an organization's cloud environment may be desirable to maintain security. For instance, let's assume that an adversary with enough time will eventually break in. The organization would want to be ready to respond when this event occurs. The monitoring process disclosed herein may combine monitoring results from within the cloud obtained by organization deployed assets, from outside the cloud obtained by cloud provider exposed data feeds and reports, and/or by the expected state of the environment as established by, e.g., an automated system that may be used by the organization to create, manage, and maintain the operating environment within the cloud and the cloud DMZ. The data gathered during the monitoring may include hardware and/or software logs, network access control (e.g., 802.1X) logs, network monitoring reports and/or scans, hypervisor level monitoring reports for virtual instances and/or the network, host integrity audits and/or host intrusion detection systems, authentication and/or API usage logs, and/or other data. The validity and/or accuracy of the monitoring may be verified by an audit that may automatically inject anomalous events to the environment and/or ensure that these are properly detected, reported and/or reacted to.

Regarding FIGS. 3-5, 12A, and 12B, any physical network link (e.g., link created by physical connection, such as network cable or fiber cable) represented by a line between components in these figures optionally may be encrypted for security measures. For example, links between components depicted in these figures as dashed lines (e.g., element 350) may represent encrypted links, links between components depicted as solid lines (e.g., element 352) may represent links that may be encrypted or unencrypted, and links between components depicted as including both a dashed line overtop of a solid line (e.g., element 354) may represent virtual encrypted links. A virtual encrypted link may be, for example, a link created by software on top of an encrypted or unencrypted physical link. In other examples, some links described above as being encrypted may be unencrypted.

Each of the systems in FIGS. 3-5, 12A, and 12B may include a tenant data center 302 and a cloud provider data center 304. A cloud provider may be an organization that creates a cloud platform used by one or more tenants to execute computational workloads. A tenant may be a user or an organization that uses the cloud platform to execute its computational workloads. The tenant data center 302 may include computer hardware (e.g., one or more computing devices 101) and software controlled by a tenant. The cloud provider data center 304 may include computer hardware (e.g., one or more computing devices 101) and software controlled by the cloud provider. The cloud provider data center 304 may provide a computational service permitting one or more tenants to execute computational workloads using virtual machines (VMs). A cloud provider may also be one of the tenants.

In an example, a VM may be a software implementation of a computer that executes computer programs as if it were a standalone physical machine. Tenants may initiate creation of VMs within the cloud environment for execution of their workloads. The tenant may request that the cloud environment instantiate a new instance of a VM that may be completely empty without any executable code, in which case the executable code such as, for example, a bootloader may be supplied by the tenant over a network. The bootloader may include instructions informing the VM of how the VM is to operate and may, for example, facilitate loading of an operating system. The bootloader may be the operating system itself, may include a workload, or both. An ordinary VM may not be trusted, but the process described below may permit a tenant to verify integrity and authenticity of a VM, as well as the hardware and software running the VM, prior to forwarding the bootloader and the workload.

Each of the systems shown in FIGS. 3-5, 12A, and 12B may include a tenant-controlled cloud demilitarized zone (DMZ) 306, which may be part of the cloud provider data center 304 (see FIGS. 3-4) or part of the tenant data center 302 (see FIG. 5), depending on a desired implementation. The tenant-controlled cloud DMZ 306 may be trusted physical space over which the tenant has physical and logical control. This space may include dedicated communication, storage, and computer components used for checking integrity, authenticity, and correctness of the cloud environment, and optimizing operation of cloud nodes. The tenant may use the cloud DMZ 306 as the basis from which to extend trust into the cloud environment.

The cloud DMZ 306 is an architecture concept that may, in some examples, build upon co-location deployments as well as remote access architecture used by an organization. It may expand these concepts to accommodate the new use case to potentially allow remotely deployed organization assets in the form of virtual machines in the cloud environment (e.g., virtual private cloud (VPC)) to connect securely and efficiently to the organization's network to access internal resources and provide computational resources for the organization. The cloud DMZ may be a co-location-like environment used to host hardware and/or software resources that are: (i) used to provide secure connectivity between the organization's virtual machines in the VPC and the organization's network extended to the cloud DMZ, and/or (ii) located physically close (such as on the same LAN) to the VPC in order to overcome technical limitations posed by the remote location of the cloud provider facility in relation to internal organization infrastructure. As an example, this could be a network attached storage infrastructure that is sufficiently latent and bandwidth sensitive to be inaccessible by the WAN.

In addition, the cloud DMZ 306 may be implemented, for example, as premises and equipment within the cloud provider facility under physical and logical control by the organization. The equipment may be located in premises to which only the organization and its contractors have access. The hardware and/or software may be owned and operated by the organization or by its contractors using the same standards and processes as the rest of the organization's internal infrastructure. For example, an organization may co-locate a small piece of compute (computing resource) that is under the organization's control at the cloud provider, which may be a third party organization. For instance, the organization might want to expand a router at which the organization's business-to-business (B2B) connection terminates to include a small set of devices that the organization owns and/or controls, and therefore trusts. The compute may be under the organization's lock and key; cloud employees outside the organization may have no access. In one example, the organization may operate various datacenters as one or more "co-lo's," (co-located compute environments), so the organization may have existing standards, processes and technologies to leverage. At a cloud provider, these co-lo's may allow the organization to establish a foothold from which the organization may extend the organization's trust, layer by layer, into the cloud environment. The organization computer network 302 and cloud DMZ 306 may utilize a co-location concept such that various devices identified in this disclosure as being on one network may be co-located on the other network. The cloud DMZ may comprise some or all of at least the following elements: external firewall 328, internal firewall 326, cloud orchestrator 318, secure boot server 1204, internal network access control device 1208, external network access control device 1206, IDS/IPS device 1210, secure gateway 330, NAS device, VPN concentrator, and/or other components/modules/devices to assist in the functionality described herein.

The tenant data center 302 may include, but is not limited to a cloud orchestrator 318, data store (e.g., internal database 322), and/or computing device 1214 coupled to a tenant network 320. The computing device 1214 may provide numerous functions, including, but not limited to those of a DHCP server, DNS server, certificate server, or other feature offered through a typical company network. The cloud orchestrator 318 may be a combination of hardware, software, and/or processes that provide automation and ensure authorization and entitlement of an instance of a VM. The internal database 322 is described in greater detail below with reference to FIG. 6. The cloud orchestrator 318 may also track state and disposition of each VM instance throughout its entire life cycle. The cloud orchestrator 318 may be deployed within the organization in order to allow, in some embodiments, the ability to orchestrate functionality across multiple cloud deployments and possibly multiple cloud providers. Even though the cloud orchestrator 318 may not be physically deployed within the cloud DMZ in all examples, the cloud orchestrator 318 may represent automation software that the organization uses to access the cloud and automate processes related to creation, deployment and sustaining the virtual machines in the cloud as well as processes related to configuring and coordinating the cloud DMZ resources to allow cloud functionality. In various aspects of the disclosure, an organization may spin up secure images from a root of trust using a series of one-time keys and validations built into each layer of the cloud DMZ infrastructure. In some embodiments, the assumptions may be that all trusted keys originate from the organization network 302, the software layers are streamed to the instances from the trusted cloud DMZ 306, and/or each layer is spun up only if the previous layers pass their validation tests. There may be a physical and/or logical component that keeps track of every instance and gives authorization to proceed to the next layer.

In some embodiments, the cloud orchestrator 318 may serve as the gatekeeper for interacting with the cloud to allocate and release resources in order to guarantee accurate state of the cloud environment. In some embodiments, the cloud orchestrator 318 may be implemented as a web application deployed using standard stack 3 within the organization to provide web user interface for users to access cloud DMZ resources as well as web services to support cloud DMZ resources. The cloud orchestrator 318 may also fulfill additional functionality as a correlation engine comparing the results obtained through the internal and external monitoring of the cloud as described herein with the expected state of the resource in the cloud. In case an anomaly is detected between the expected and actual state of the resources in the cloud, the cloud orchestrator 318 may generate an alert as well as take corrective action.

In some embodiments, the cloud DMZ 306 may include a network attached storage (NAS) device 1212. The NAS device may be used to provide network attached storage for cloud DMZ resources and virtual machines in the cloud (cloud instances). Specifically, the NAS device may provide storage for: (1) VM images if any of the cloud DMZ components are implemented using virtual machines running on a specific virtualization platform; (2) an application server to store the components required to initialize the operating system (OS) boot process; (3) providing distribution mechanism to dynamically deploy and load the application from within the virtual machines in the cloud; and/or (4) network accessible storage space that VM instances in the VPC may utilize to store data outside of cloud environment, e.g., for security reasons (such as not storing proprietary or confidential data in the cloud environment) or for preservation of state of the cloud resources when these are released.

In addition, the tenant data center 302 may include a firewall 316 to control communication between tenant network 320 and router 314, and router 314 may communicate with a router 324 of cloud provider data center 304. When tenant-controlled cloud DMZ 306 is included in cloud provider data center 304 (see FIGS. 3-4, 12A, and 12B) and to protect against threats, tenant-controlled cloud DMZ 306 may include an internal firewall 326 and an external firewall 328. The firewalls 326 and 328 may regulate types of data and communications that may enter and leave tenant-controlled cloud DMZ 306. More specifically, referring to FIGS. 12A and 12B, the firewalls (326, 328) may form the entry points of a secure cloud gateway 1202. The cloud gateway 1202 may include a gateway server 1216 that, among other things, controls and manages requests to create secure connections through the cloud gateway 1202. The cloud gateway 1202 may also, in some examples, optionally include an internal host integrity detection/audit device (or network access control device) 1208 and an external host integrity detection/audit device (or network access control device) 1206. The network access control devices (1206, 1208) may assist in integrity audits before or after a virtual machine in the VPC 308 is granted access to the corporate network 302. In some examples, the cloud gateway 102 may also optionally include a device configured to monitor and/or control decrypted network traffic (e.g., an IDS/IPS server 1210). Although the various features provided in the cloud gateway 1202 have been depicted in the figures as separate server devices, the disclosure contemplates one or more of the illustrated devices being combined or sharing processor/memory resources.

The role of external firewall 328 is to allow only the traffic from/to the virtual machines in the cloud that were created by authorized process. In some embodiments, the traffic that is allowed between the virtual private cloud and the cloud DMZ should satisfy one or more constraints. For example, one constraint may be that the source of the incoming traffic and/or the destination of the outgoing traffic (IP address/MAC address) should be only a virtual machine that was created by the cloud orchestrator using the process described in this document and the machine should be up and running at the moment when the traffic is received. Another example of a constraint may be that during the boot phase only secure (e.g., HTTPS) traffic may be allowed to/from any given virtual machine; the source of the outgoing traffic may be only the secure boot server used for securely booting the VM over a network. The different phases (e.g., create phase, boot phase, unlock phase, connect phase, and the like) available, in accordance with various aspects of the disclosure, may be found throughout the disclosure, including but not limited to FIGS. 6, 10A, and 10B. Yet another example of a constraint may be that during the unlock phase, only SSH traffic may be allowed to/from any given virtual machine. The source of the outgoing traffic may be only the cloud orchestrator server used to automate the unlock process. In addition, another example of a constraint may be that during the connect and the compute phases, only secure (e.g. virtual private network (VPN) and/or Internet Protocol security (IPSec)) traffic may be allowed to/from or to any given virtual machine. The VPN may use a digital certificate, username/unique token, and password to create a secure channel for the traffic. The source of the outgoing traffic may be only the secure gateway device used to provide internal endpoint for the secure tunnel between cloud DMZ and the virtual machine (VM). These constraints may be implemented as dynamic rules which may be configured and turned on and off in an automated fashion by a cloud orchestrator or other device when it creates and/or deploys the virtual machines in the cloud. If such functionality is not available and the rules have to be configured in a static way, e.g. for a pool of all potential IP/MAC addresses that might be active in the cloud at any given moment and any protocols that can be used at any given moment, additional detection may be performed by analysis of firewall logs to ensure that only the allowed traffic is actually present.

Meanwhile, the role of internal firewall 326 may be to allow only the traffic from/to the IP addresses allocated by the secure gateway to the secure tunnels established by the virtual machines in the cloud that were created by the process described herein. The virtual machines may be in the connect and compute phases which are the phases when the secure tunnel is established. These constraints may be implemented as dynamic rules which can be configured and turned on and off in an automated fashion by a cloud orchestrator when it authorizes creation of the secure tunnel and only for the duration of existence of such secure tunnel. If such functionality is not available and the rules have to be configured in a static way, e.g. for a pool of all potential IP/MAC addresses that might be active in the cloud at any given moment and any protocols that can be used at any given moment, additional detection may be performed by analysis of firewall logs to ensure that only the allowed traffic is actually present.

In addition, the cloud environment of FIGS. 3-5, 12A, and 12B may include one or more secure gateway devices (with or without related client software) and IDS/IPS devices 1210. The role of the secure gateway device may be to provide internal endpoint for the secure tunnel between cloud DMZ and the VM allowing all traffic between the cloud VMs and the cloud DMZ and the cloud VM-to-VM traffic to be fully encrypted. The other endpoint of the secure tunnel may be implemented by a software client deployed and configured within the virtual machines running in the cloud. The device may be configured to allow establishing the secure tunnel only for the virtual machine that was created by the cloud orchestrator using the process described herein and the machine should be up and running at the moment when the request is received. This may be accomplished by verifying the certificate and the private key presented by the VM during the connect phase (see FIGS. 10A & 10B) against the list of certificates issued and not revoked by the organization's certificate authority. The certificate and the private key may be delivered to the VM during the unlock phase (see FIGS. 10A & 10B) and may be temporarily stored in the shared memory of the VM. The verification of temporal validity of the request to establish the secure tunnel (e.g. should the VM issuing the request be actually running in the cloud and be in the connect phase) may be performed, e.g., by third-party appliance authentication validation using HTTP form validation method against web service provided by the cloud orchestrator for this purpose. The credentials or unique tokens used for this validation may be presented by the virtual machine during the connect phase and delivered to the VM during the unlock phase and may be stored in the VM only temporarily in the shared memory. The secure gateway device may be responsible for integrating with a host integrity detection (HID) system to validate the integrity of the connecting virtual machine (e.g., confirming the authenticity of the loaded components) before the secure tunnel is fully established. The secure gateway device may be responsible for issuing an IP address to the connecting VM that may be used as the IP address of the secure NIC implemented by the client software within the VM in order to provide the secure tunnel. The issued IP address may be an internal organization IP address routable on a network. In addition, the IDS/IPS device may be responsible for monitoring of the unencrypted traffic from within the secure tunnels created by the secure gateway device that is either coming from the virtual machines in the cloud or is destined to the virtual machines in the cloud. The goal of this monitoring may be to detect any unusual or anomalous patterns.

In some examples, the external firewall 328 may be coupled to a cloud virtual local area network (VLAN) 340. The VLAN 340 may be dedicated to a single tenant, and all VMs attached to this VLAN may belong to the same tenant. A VM may, in some examples, be considered a "Measured VM" when running in a cloud environment whose authenticity has been verified using the process described herein by remotely attesting to a virtualization platform and hardware on which the VM is running. FIG. 3 depicts three Measured VMs 342A-C; however, any number of virtual machines may be used and the virtual machines need not necessarily be measured VMs in numerous other examples in accordance with aspects of the disclosure. Virtual private cloud 308 may represent VMs instantiated for a particular tenant. The VLAN 340 may also be connected to virtual provide clouds for other tenants 312. The cloud environment (e.g., virtual private cloud) for other tenants 312 may represent the VMs instantiated for other tenants. As such, the systems in FIGS. 3-5, 12A, and 12B may be multi-tenant environments as each may instantiate one or more VMs for each tenant.

The router 324 may be coupled, in some examples (e.g., see FIG. 5) to cloud infrastructure 310 at a cloud platform physical infrastructure 336 that provides a cloud platform 332. The cloud infrastructure 310 may include the hardware and software to implement the measured VMs 342. The cloud platform physical infrastructure 336 may be the hardware on which the cloud platform 332 runs. The cloud platform 332 may be software that provides the cloud environment. Cloud platform physical infrastructure 336 may be coupled to virtualization platform physical infrastructure 338 that provides the virtualization platform 334 running the measured VMs 342.

The systems depicted in FIGS. 4 and 5 have similar components to the system of FIG. 3, but differ in the location of tenant-controlled cloud DMZ 306 and the components included in the DMZ 306. For example, FIG. 4 depicts cloud orchestrator 318 and internal database 322 being part of tenant-controlled cloud DMZ 306 and included in cloud provider data center 304. Moreover, although not shown in FIG. 4, the tenant data center 302 may include cloud orchestrator 318, internal database 322, and/or other components/devices/ modules as illustrated in FIG. 3 and previously illustrated in U.S. Provisional Patent Application No. 61/476,747 (attorney docket no. 007131.01045), which is incorporated by reference herein in its entirety. In some examples, the cloud orchestrator 318 may operate under a client-server model (or comparable model), as illustrated in U.S. Provisional Patent Application No. 61/476,747, where a server component of the cloud orchestrator 318 may be located at a tenant data center 302 while a client component of the cloud orchestrator 318 may be located at a tenant-controlled cloud DMZ 306.

Figure 10A:
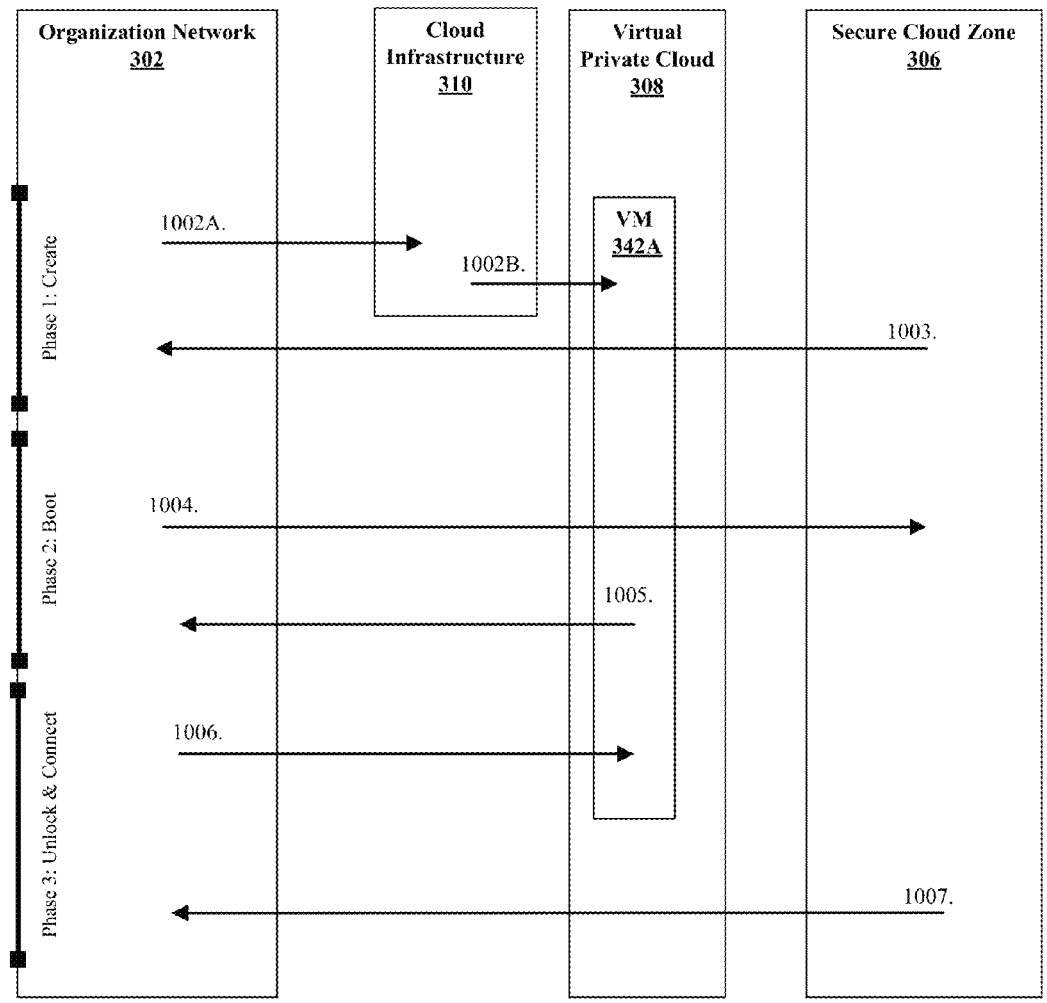
FIGS. 10A and 10B illustrate an example flow diagram of various communications between a cloud DMZ, cloud provider including virtual private cloud (VPC), and/or company's network in accordance with illustrative embodiments.
Figure 10B:
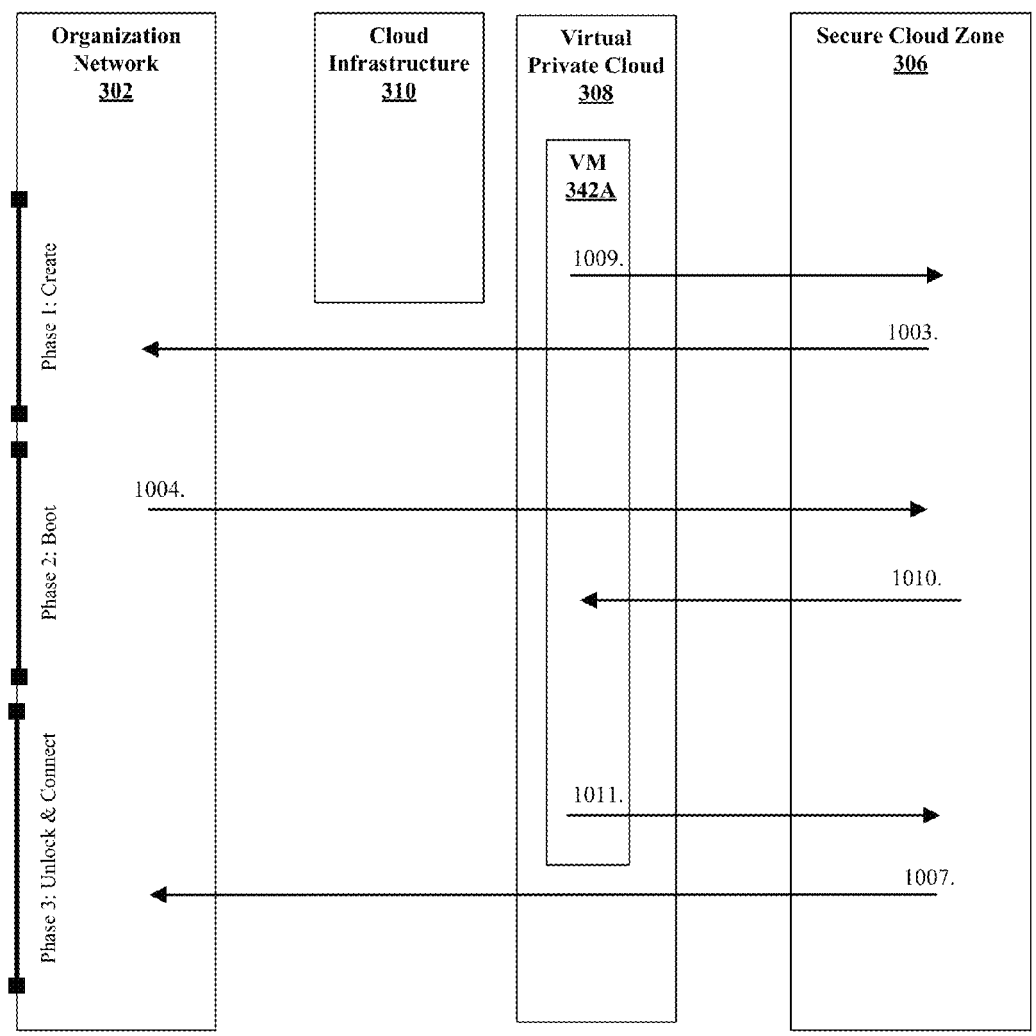

In addition, the tenant-controlled cloud DMZ 306 of FIG. 4 may include a secure/trusted boot server 330, which may be a physical machine or a virtual machine running a secure server (e.g., HTTPS server) and be used to implement a secure boot process in accordance with various aspects of the disclosure. The secure/trusted boot server 330 may comprise an application server and/or the functionality of an application server. This application server may, in cooperation with a cloud orchestrator 318, authenticate and/or authorize the request to ensure that the virtual machine from which the boot request originated is in fact in the boot phase, and then identify and/or create the unique components (e.g., initial ramdisk, and the like) configured to initialize the OS boot process which should be delivered to the virtual machine 342A. These files may be created and/or stored in the cloud DMZ 306. At least one benefit of such an arrangement is that it may avoid needing to repeatedly transfer these multi-megabyte files over the WAN connection between the organization and the cloud. However, in an alternate example, the unique components may be created at the data center 302 and transmitted to the boot server 330. The secure boot process may allow the virtual machine in the cloud (e.g., VM 342A in VPC 308) to securely boot an operating system over a secured transport protocol (e.g., HTTPS protocol) from a server (e.g., server 1204) located in the cloud DMZ 306, as described herein. Upon request from the virtual machine 342A in the cloud, the server (e.g., HTTPS server) may deliver to the VM unique components (e.g., an instance of the kernel and/or unique initial ramdisk, or other components) reserved for this VM instance by the cloud orchestrator 318 when the virtual machine has been created to initialize the boot process. Each unique bootable portion of the operating system (e.g., initial ramdisk) may contain a unique confidential information (e.g., public cryptographic key for a corresponding unique private key stored with the cloud orchestrator 318, e.g., in a database in communication with the cloud orchestrator 318). Moreover, in some examples, the environment may be configured to provide a unique user account to establish the secure (e.g., SSH) connectivity during the unlock phase. The use of unique keys and/or accounts may guarantee that only the cloud orchestrator will be able to connect to the newly created and booted VM. The creation, booting, unlocking, monitoring, and/or use of the virtual machine, in one example in accordance with various aspects of the disclosure, are illustrated in FIGS. 10A and 10B

One or more aspects of a custom implementation of the PXE specification, may be enhanced and/or used for network booting of the operating system of the created virtual machine 342A in the cloud (e.g., VPC 308) in accordance with various aspects of the disclosure. This may be accomplished by, among other things, deploying to the cloud as an alternate virtual network card firmware configured on the virtual machine definition and/or as a bootable ISO preconfigured at the virtual machine definition as a boot source. For example, integration with virtualization platform may allow configuration of a custom PXE boot loader from the virtualization platform (or cloud platform using specific virtualization platform) as well as monitoring of the boot process from the platform. Such an example may include a method to pass data between the configuration platform running outside of the virtualized environment and custom PXE implementation running inside the virtualized environment.

In some examples, the custom PXE implementation may allow static configuration of the networking settings of the virtual machine before the boot process starts. The virtualization platform may be able to pass, using the aforementioned method, the specified network configuration (IP address, gateway, and the like) to the customer PXE implementation to enable the PXE network stack to use static network settings and, in some examples, eliminate the use of DHCP. In the cloud, this configuration may be specific to each individual VM and/or may be configured outside of the virtualized environment. The virtualization platform may also be able to pass into the custom PXE implementation specific URL and any other settings, from which the custom PXE loader may load the operating system (OS) and its components in order to have control over the source of the runtime components. In the cloud this may be, for example, a global setting for each organization's environment (e.g., set of VMs) or may be specific to each VM.

In another example, the custom PXE implementation may be used for boot source validation and/or boot request validation. Regarding boot source validation, the virtualization platform may be able to pass, using the aforementioned method, into the custom PXE loader a criteria, which may be used to validate the authenticity of the source of the operating system (OS) components to load. This may mean that, for example, the system is able to specify the certificate authority issuing the public certificate of the organization's secure (e.g., HTTPS) PXE server as a valid source of the OS components that may be run by given VM. If the server's public certificate was not issued by the specified certificate authority, the custom PXE loader may refuse to load/run the specified components. In the cloud this may be, for example, a global setting for each organization's environment (e.g., set of VMs) or may be specific to each VM. The same concept may be applied to validation of digital signatures of the downloaded content. Regarding boot request authorization, the virtualized platform may also be able to pass, using the aforementioned method, into the customer PXE loader a token, which may be used by the system to authenticate its request to load the OS components from a secure (e.g., HTTPS) server. Such a process may provide the opportunity to authorize every single attempt to boot the OS from server 330. In the cloud this may be, for example, a unique token which changes for every single request to boot the OS (e.g., a single-use software token).

Elaborating on the prior examples related to PXE and PXE enhancements, one or more aspects of the PXE implementation may be enhanced using secure communication transfer protocol such as HTTPS for communication with the boot server and/or for transfer of the requested bootable components, and mutual authentication (such as HTTPS authentication based on client and server certificates). In one example, HTTPS authentication may be used to perform authentication of each (or some) boot requests before allowing downloading of OS (or other) components from the server. The custom PXE loader may load the bootable portion of the operating system (e.g., system kernel) over the secure (e.g., HTTPS) channel, and in case of particular operating systems, directly load and boot the unique components (e.g., kernel and/or initial ramdisk) over the network without requiring to first load separate boot loader. At least one benefit of such an implementation is that it may allow elimination of one of the standard boot components from the setup and simplify the maintenance and management of the system. In addition, in some examples, the custom PXE loader may verify digital signatures of the downloaded content. At least one benefit of such an implementation is that it may allow signing of the operating system (OS) components which should be downloaded from the network and then configure the custom PXE loader to require valid signature before they can be run. Additionally, the custom PXE loader, in some examples, may include the ability to perform all certificate, public/private key operations in conjunction with HSM (e.g. Network Attached HSM), potentially allowing the HSM to manage/verify the certificates.

Meanwhile, FIG. 5 depicts tenant-controlled cloud DMZ 306 being located entirely within tenant data center 302. Although referred to as "tenant-controlled cloud DMZ 306" for consistency, the tenant-controlled DMZ in FIG. 5 is not located at the cloud provider data center 304 and may be more appropriately labeled as the tenant-controlled DMZ. Tenant-controlled cloud DMZ 306 of FIG. 5 includes cloud orchestrator 318, internal database 322, and Secure/Trusted boot server 330.

It is noted that, in the description provided herein, some operations are attributed to a certain device, component, software, and the like. It is within the scope of the example embodiments that operations performed by one element may be performed by another element. Further, multiple elements may be combined into a single apparatus that performs the operations of the different elements, and operations described as being performed by a single element may be performed by multiple subelements.

An issue with using conventional cloud environments is that a tenant may not trust the cloud infrastructure 310 that provides the cloud environment, nor the virtual environment it provides. To permit attestation of integrity and authenticity of the hardware and software running a VM, the cloud provider may incorporate a trusted protection module (TPM) 344 into each virtualization platform physical infrastructure 338 so that the hardware and software running the VMs, as well as a configuration of the VMs, can be confirmed by the tenant to be reliable. For example, the infrastructure 338 may be a collection of servers, and each server may include at least one TPM 344.

TPM technology was conventionally designed to be anonymous and to protect the privacy of the TPM owner. TPM keys and TPM quotes were not uniquely tied to an individual piece of hardware. In the example embodiments, rather than providing privacy, tenants may determine which piece of TPM hardware has a particular key and produced a particular TPM quote. Since TPM technology prevents creating such an association in an automated fashion, the cloud provider may be responsible for creation and correctness of an association between a particular TPM and a TPM quote. This responsibility could be further enforced by binding legal agreements between tenant and cloud provider.

In an example, the cloud provider may create and maintain a trusted and verifiable inventory of valid attestation identity keys (AIK). AIKs may be a public/private key pair. This inventory of keys may identify which public key is associated with which TPM. The inventory may also identify which physical infrastructure 338 contains a particular TPM 344 having a particular AIK public key. The cloud provider may provide each tenant with the inventory using a trusted verifiable process so that the tenant is aware of valid public keys (e.g., AIK, TPM transport session key), and which TPM corresponds to a particular physical infrastructure 338. For example, the tenant may store the key inventory in internal database 233.

To permit a tenant to confirm the authenticity of the key inventory, the cloud provider may sign the inventory using a cloud provider private key which any tenant may verify by confirming the signature using a cloud provider public key. Also, a cryptographic hash of the current inventory, for example, may be made available in other manners (e.g., on a cloud provider website or over the phone with appropriate cloud provider personnel). The cloud provider may also support a method to verify authenticity of the AIK public keys using, for example, Privacy CA (PrivacyCA) or Direct Anonymous Attestation (DAA) Protocol. The tenant may use such a method to validate received AIK public keys to ensure that these are in fact generated by a particular TPM 344.

The cloud provider may update the inventory every time new physical infrastructure 338 containing a TPM is added or removed from the cloud infrastructure 310. At that time, the cloud provider may provide to the tenant an updated key inventory with an updated list of keys. The keys may by audited by physically interrogating a specific physical infrastructure 338 (e.g., by booting the physical infrastructure 338 from trusted media and querying the TPM 344 directly to verify the keys in the inventory associated with the physical infrastructure 338). The tenant may store validated keys, as well as keys which fail validation, in internal database 322 for use during a process of remote attestation of a Measured VM 342.

At this point, the tenant may trust two things: first, what the tenant has physical and logical control over (e.g., the cloud DMZ 306, tenant data center 302); and second, TPMs 344 and computer chips within the cloud environment incorporating core root of trust measurement (CRTM) technology. TPMs 344 may be trusted as they may be provided by trusted vendors and the authenticity of the keys of the TPM 344 has been verified and audited by the cloud provider. Active Management Technology (AMT), for example, may be used as a CRTM for TXT architecture. Since the tenant is remote from a TPM, the attestation of the integrity and authenticity of the cloud infrastructure 310 has to be performed remotely, and is thus referred to as remote attestation. Conventional TPMs may provide support for remote attestation, such as a TPM transport session, but this support might not be complete and might not address all possible threats, such as, for example, MiM (man in middle) attack and relay/masquerading attack. The example embodiments provide for establishing a secure channel between tenant data center 302 and a TPM 344 to perform remote attestation while protecting against these, and other, types of attacks. The following describes a remote attestation process for establishing, using a TPM 344, trust across a cloud environment between the tenant data center 302 and the cloud infrastructure 310.

Figure 6:
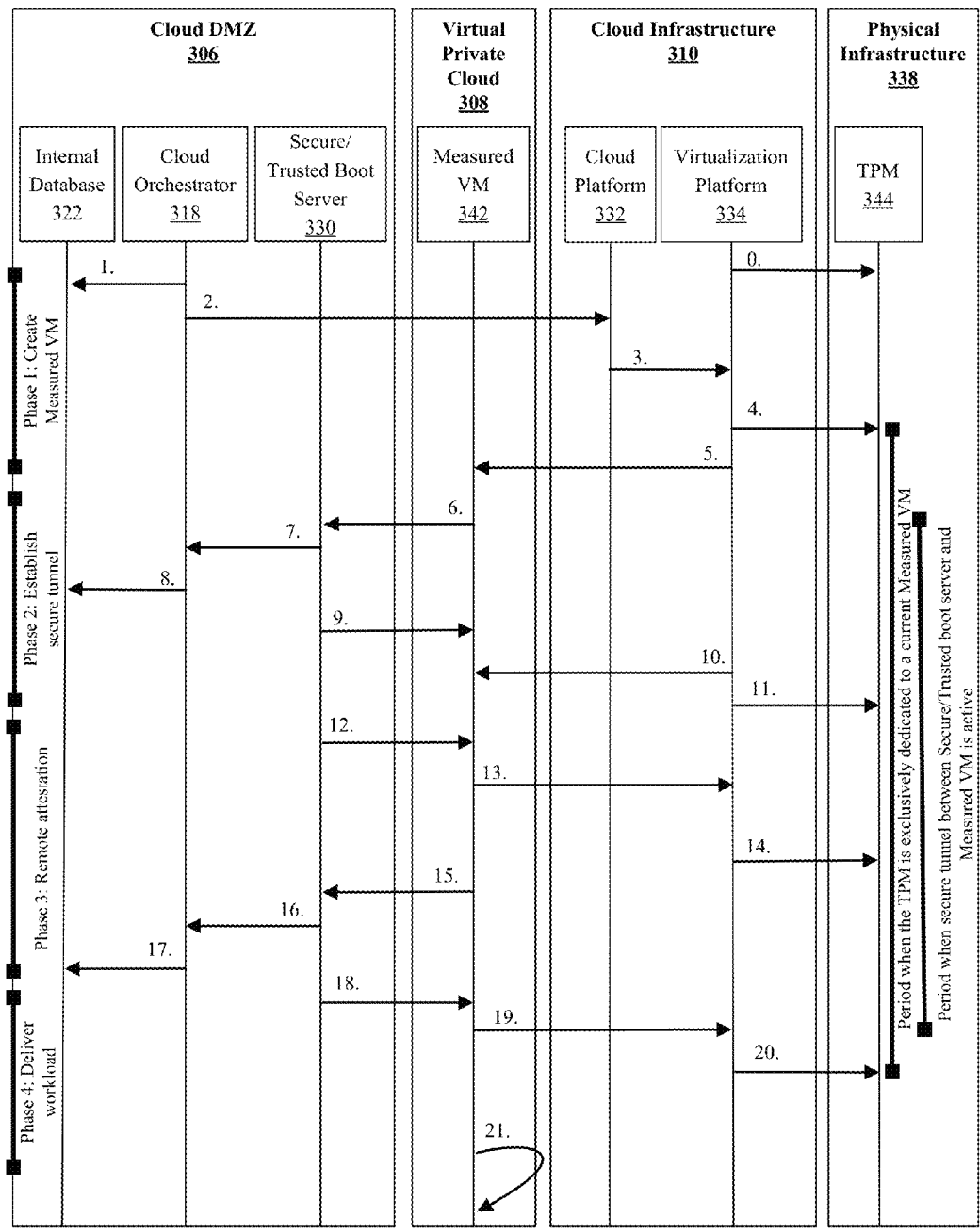
FIG. 6 illustrates an example flow diagram of communications between a Cloud DMZ, cloud virtualization platform and a trusted protected module (TPM) for performing remote attestation of integrity and authenticity of a cloud computing environment, in accordance with example embodiments.
Figure 12A:
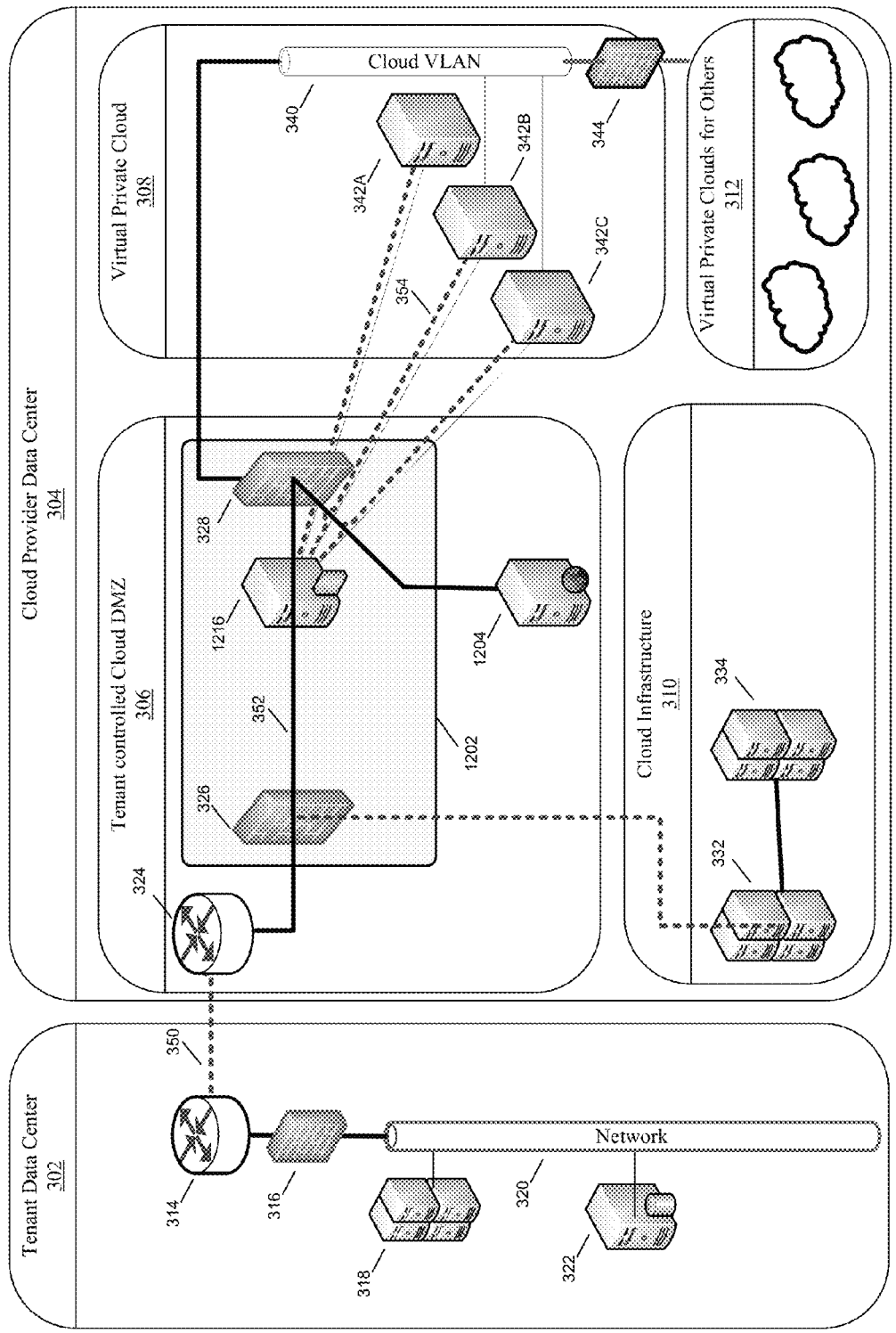
FIGS. 12A and 12B illustrate example systems for securely loading and booting an operating system image on a virtual machine instance in a cloud computing environment, in accordance with example embodiments.
Figure 12B:
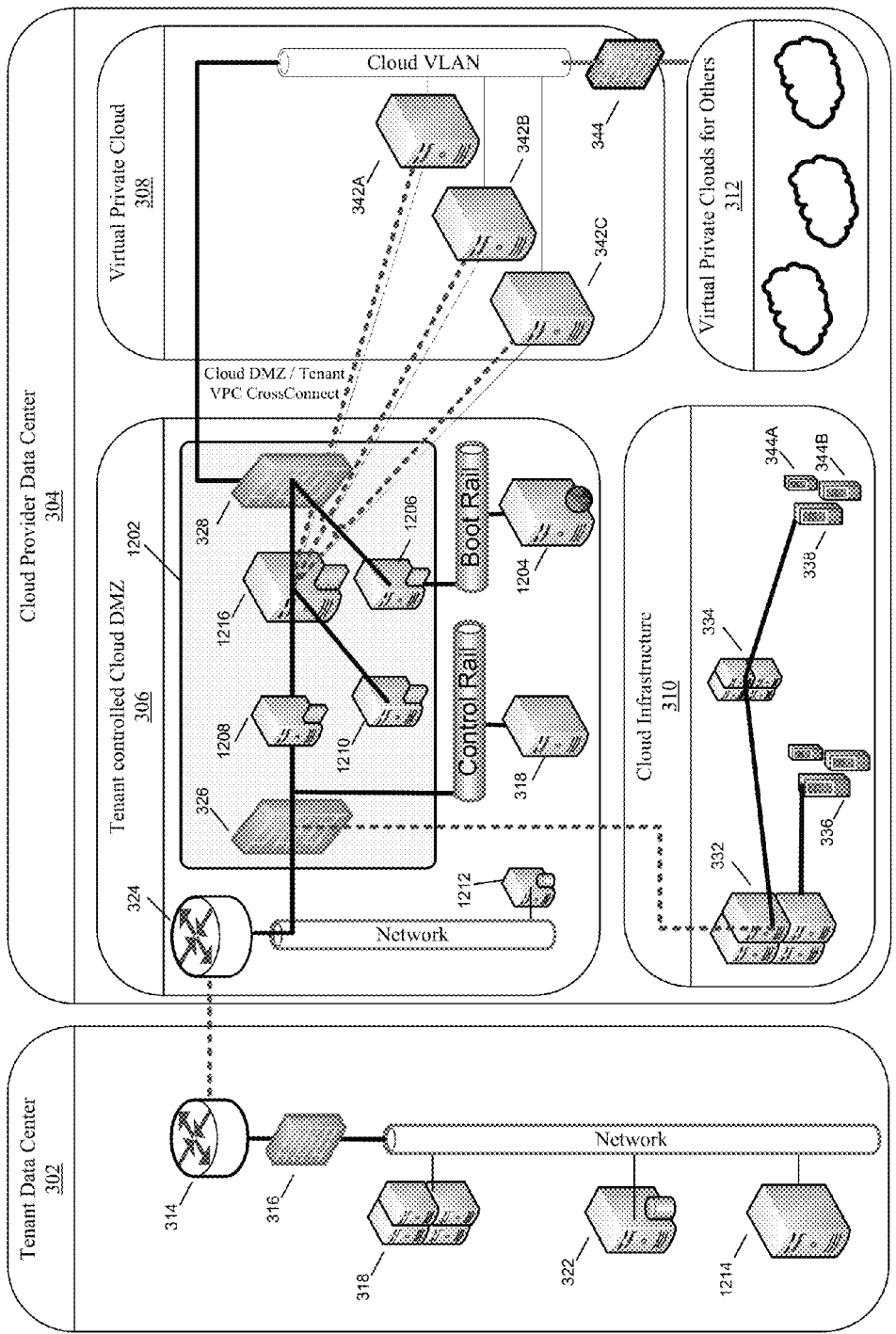

FIG. 6 illustrates an example flow diagram of communications between cloud DMZ 306, cloud infrastructure 310, and physical infrastructure 338 to perform remote attestation of integrity and authenticity of a VM, in accordance with example embodiments. In one example, the flow diagram proceeds through 4 phases. In a first phase, a measured VM is created. In a second phase, a secure tunnel is established between the Secure/Trusted server 330 and the Measured VM 342. In a third phase, remote attestation of the measured VM occurs. In a fourth phase, a workload is delivered to the Measured VM for execution. Although the elements of FIG. 6 have been described using a measured VM, one of skill in the art after review of the entirety disclosed herein will appreciate that portions of the examples of FIG. 6 may be performed using non-measured VMs with appropriate modification to steps and apparatuses involved. For example, steps diagramed in FIGS. 10A and 10B and apparatuses illustrated in FIGS. 12A and 12B are contemplated and may be substituted in the examples of FIG. 6 with a non-measured VM.

Phase 1: Creating a Measured VM

With reference to element 0 of FIG. 6, prior to instantiating a new measured VM 342, the TPM 344 may store measurements of some or all binaries, configuration settings, and/or other related information of the virtualization platform 334, and store these values within platform configuration registers (PCR) registers of the TPM 344. In an example, a TPM 344 may be a specialized hardware chip that is designed to hold keys, perform cryptographic and attestation operations, and is tamper evident (e.g., if the TPM is tampered with, the TPM will allow detection of such tampering).

In an example, TPM 344 may store attestation identity keys (AIKs). AIKs may be a public/private key pair that may be used during an attestation process in which the TPM 344 provides a TPM quote that is a function of the stored measurement values and the private key. The private key may be stored by the TPM 344 and kept unrevealed, in some examples. The private key may be unique to the TPM 344, and the TPM 344 may store one or more public/private key pairs. The public key may be publicly available and used to decrypt the TPM quote to confirm that the TPM is the device that actually created the quote. Because the private key is unique to the TPM 344, the tenant knows that only TPM 344, and not some other device, could have created the TPM quote. Public and private keys stored by the TPM 344 may be trusted as the authenticity of these keys may have been verified, for example, using Privacy Certification Authority (PrivacyCA) or Direct Anonymous Attestation (DAA) protocol.

The physical infrastructure 338 may incorporate Dynamic Root of Trust Measurement (DRTM) technology to work with the TPM 344. The DRTM technology may be implemented by a central processing unit (CPU) and chipset of the physical infrastructure 338. Examples of DRT technology are known in the art, such as the TXT technology. DRTM technology may provide protection and support for secure computing. DRTM technology may include extensions to microprocessors and chipsets for establishing hardware-based trust and control in a cloud environment. DRTM technology may measure various environment elements without the need to restart hardware of the TPM 344 and also may provide protection against unauthorized access to memory of the physical infrastructure 338 that implements DRTM technology.

The TPM 344 may store measurements of some or every software element participating in a startup process for a measured VM (e.g., including but not limited to CPU, Firmware, Basic Input/Output System (BIOS), BIOS Option Modules, bootloader, virtualization platform, loadable modules, configuration information, and the like), hardware that makes up the physical infrastructure 338, and software and configuration information of the virtualization platform 334. In an example, a measurement may be of at least one of a configuration parameter (e.g., software version, hardware, and the like) of a device or software, or of a configuration that the tenant may wish to authenticate prior to communicating with the device. The measurement may also be of a binary code (e.g., CPU microcode, firmware, BIOS, bootloader, operating system component, virtualization platform component, device driver, application, and the like) that the tenant may wish to authenticate. For example, the tenant may wish to confirm that a device is running a particular software version using a particular piece of hardware.

In an example, a measurement may be a cryptographic hash (e.g., using a secure hash algorithm (SHA)) of one or more of a binary BIOS code, firmware of each device in the physical infrastructure 338, bootloader, each binary module of the virtualization platform 334 including virtual BIOS and device firmware of the virtual machines created by this virtualization platform, and the like. Example requirements of measurements for a PC platform are defined by "TCG PC Client Specific Implementation Specification For Conventional BIOS, Version 1.20 Final, Jul. 13, 2005, For TPM Family 1.2; Level 2," the contents of which are incorporated herein by reference in its entirety. The measurements stored within TPM as part of element 0 of FIG. 6 may be tenant-independent, and therefore may apply to all tenants that use the virtualization platform 334.

In an example, physical infrastructure 338 may include a code segment that is trusted, and in which trust in other code segments may be established. The trusted code segment may be hard coded into the processor, for example. The processor (e.g., processor 103) may execute the trusted code segment to measure a first initially untrusted code segment to verify its integrity and pass the measurement value to the TPM 344 for storage. TPM 344 may add the measurement value to a value stored in the PCR register. The measurement may be information (e.g., a cryptographic hash) that may uniquely describe another piece of information (e.g., a segment of binary code or data). The TPM 344 may combine the measurement value with an existing value stored by a PCR register to prevent spoofing of specific values.

Once integrity of the first initially untrusted code segment is confirmed, that code segment may be considered trusted. Control may be passed to the newly trusted code segment for measuring a second initially untrusted code segment and storing that measurement value in the TPM 344. Once integrity of the first initially untrusted code segment is confirmed, that code segment may be considered trusted and control may be passed to the second newly trusted code segment. This code segment by code segment process of making and storing measurement values may establish a chain of trust back to the trusted code segment to confirm integrity and authenticity of a desired number of code segments. As such, root of trust may move from one segment of computer code to a next segment of code stored within the physical infrastructure 338 when making measurements on each code segment.

In a more detailed example, BIOS boot code of the physical infrastructure 338 may be a code segment that is trusted. The processor 103 may execute the BIOS boot code segment to make a measurement of a next code segment (e.g., bootloader), and then store the measurement value of bootloader code segment in the TPM 344. The BIOS boot code segment may pass control to the bootloader code segment. The processor 103 may execute the bootloader code segment to make a measurement of a next code segment (e.g., operating system), and store the measurement value of the operating system code segment in the TPM 344. This process may continue until a desired number of code segments have been measured and measurement values stored in the TPM 344. In an example, a CRTM is established. The CRTM is measured and the measurement is stored in the TPM 344 for a next software element in the stack (e.g., BIOS), which does the same for the next element (e.g., bootloader) and so on until the measurements for the elements of the virtualization platforms are established and stored in the TPM 344. Physical infrastructure 338 may similarly measure the virtual platform 334 and a VM.

With reference to element 1 in FIG. 6, when the tenant desires to have a Measured VM created, cloud orchestrator 318 (e.g., cloud orchestrator server) may create and store, within a data store (e.g., internal database 322), a reservation R with unique authentication code U and specific networking settings including a virtual internet protocol (VIP) address I. The cloud provider may assign the VIP address I as the network address for a newly created VM. The Secure/Trusted boot server 330 may subsequently expect to receive a request to download a bootloader from VIP address I. The authentication code U may serve as a nonce for associating a request to create a Measured VM with a request that the Measured VM later sends to the tenant's Secure/Trusted boot server 330 to download the bootloader. A nonce may be an arbitrary number (for example, used only once to prevent replay attacks) that may be used by the TPM 344 to generate a TPM quote. The authentication code U may be used to confirm that cloud orchestrator 318 was the device that sent the create Measured VM request, and not some other device.

With reference to element 2, cloud orchestrator 318 may send a create Measured VM request to an application programming interface (API) of cloud platform 332. The request may include the networking settings (e.g., VIP address I), the unique authentication code U, tenant-specified configurations, as well as any additional details required by the cloud provider to create the virtual machine, such as VM configuration (e.g., VM size, disk size, and the like).

With reference to element 3, cloud platform 332 may forward the request to the virtualization platform 334. For example, cloud platform 332 may invoke a software application programming interface (API) instructing the virtualization platform 334 to instantiate a measured VM based on at least one of the provided network settings (e.g., a VIP address I), authentication code U, and VM configuration, tenant-specified configurations, additional details from the cloud provider, and the like.

With reference to element 4, the virtualization platform 334 may be dedicated to a single Measured VM 342 in some examples, and hence may perform remote attestation for one Measured VM 342 at a time. The virtualization platform 334 might not allow any other measured VM or software to use the TPM 344, while the TPM 344 is being used for remote attestation of the current Measured VM. In some examples, the TPM 344 may not be virtualized. For the current Measured VM, the TPM 344 may store measured binaries (e.g., VM specific firmware, BIOS, and loadable modules) and a configuration of the Measured VM 342, in a set of PCR registers dedicated for VM measurements.

For example, the virtualization platform 334 may reserve (1–n) PCR registers in the TPM 344 for storing measurements of the configuration of the Measured VM 342. The measurements may include a certificate authority of the Secure/Trusted boot server 330 from which the Measured VM 342 is to boot as well as a network address (e.g., VIP address I, a uniform resource locator (URL), and the like) of the boot server 330. At least some of the measurements may be tenant-specific since they may include configuration information specified by the tenant. From this point until a secure boot sequence for the Measured VM 342 is completed or aborted, the TPM 344 may be dedicated to this Measured VM and the TPM 344 may be queried by the tenant that requested instantiation of the Measured VM. The TPM 344 may release the PCR registers when the Measured VM completes a secure/trusted boot sequence and receives a bootloader from a configured Secure/Trusted boot server 330, or when the boot sequence fails, as described in further detail below.

To ensure that environment issues such as network connectivity, incorrectly configured Measured VM, or incorrectly behaving Secure/Trusted boot server 330 cannot block creation of Measured VMs indefinitely, the virtualization platform 334 configuration may specify a time threshold within which a Measured VM 342 may be required, in some examples, to complete an attestation sequence and receive its bootloader. If the Measured VM 342 doesn't receive the bootloader in the allotted time, the virtualization platform 334 may destroy the Measured VM 342.

With reference to element 5, the virtualization platform 334 may create and initialize an instance of a Measured VM with VIP address I and authentication code U. Upon creation, the Measured VM 342 may be an empty shell, without any software or operating system. The Measured VM 342 may also contain a fully encrypted operating system (OS) or other software which cannot be executed until it is unlocked/decrypted by the tenant by providing an appropriate key or decrypting software, once the integrity and authenticity of the Measured VM has been confirmed. In one example, an operating system (OS) template accessible from the cloud provider environment 304 may be used to create new VM instances in the cloud environment (e.g., virtual private cloud 308) dedicated to the organization. These OS templates might not contain any unencrypted elements, such that if the boot loader of the boot partition is unencrypted, it may not be part of such a template. The templates may be implemented such that they do not contain confidential information (e.g., any certificates, shared secrets, keys, and the like) that need to be kept secret or protected from being compromised. The fully encrypted organization OS template may be created using industry standard encryption algorithms using processes and parameters that follow approved organization standards. Or, they may be created using industry standard whole disk encryption software that may be approved for such use by the organization. Or, they may be created as fully encrypted within the secure perimeter of the organization by the trusted internal personnel. Or, they may be transferred to the cloud environment over a secure channel. Or, they may be audited before they are used to verify their authenticity. Or, the keys/passphrases (e.g., confidential information) to decrypt them may be kept secret following the applicable organization standards. Or, the keys/passphrases used to encrypt the images may be rotated following the applicable organization standards. Or, the OS templates may be patched using approved organization processes, instances may be recreated. In addition, the OS template may contain additional software components used to implement secure connectivity between the VM and the cloud DMZ 306. In some embodiments, for example, an SSH server embedded in the initial ramdisk may be used, and client-server software may be installed within the template itself. The template may further contain additional components used to provide integrity of the image and the VM, such as host integrity detection software, host intrusion prevention software, network monitoring software, and the like.

Phase 2: Establishing a Secure Tunnel

With reference to element 6, a basic input/output system (BIOS) of the Measured VM 342 may initiate a preboot execution environment (PXE) networking stack using networking settings, including VIP address I, specified by the virtualization platform 334 during creation of the Measured VM 342. Also, the PXE networking stack may dynamically obtain a network address, instead of or in addition to Virtual IP address I, using dynamic host configuration protocol (DHCP) protocol. The PXE may be an environment and process for booting computers of virtual machines using a boot loader and/or an entire operating system received from the tenant over a network.

Upon initiation, the BIOS may start a PXE boot sequence by sending a PXE boot request to the Secure/Trusted boot server 330 specified by the virtualization platform 334. The boot server 330 may be configured to remotely attest to the authenticity of a Measured VM and to upload a workload to the Measured VM if authentic. As noted above, remote attestation may refer to a process of remotely verifying the integrity and authenticity of the virtualization platform 334 and the infrastructure 338 on which the platform 334 is running, as well as the integrity and authenticity of the Measured VM 342. Measured VM 342 may include the unique authentication code U specified by the virtualization platform 334 in the PXE boot request. The PXE boot request may be considered as an initial request of a handshake to establish a secure tunnel (e.g., using a transport layer security (TLS) protocol) between the Measured VM 342 and the Secure/Trusted boot server 330.

With reference to element 7, upon receiving the PXE boot request, the boot server 330 may query the cloud orchestrator 318 for a reservation R corresponding to information provided in the PXE boot request in an attempt to associate the PXE boot request with the original request to create the Measured VM sent by the cloud orchestrator 318, described above in elements 1-2.

With reference to element 8, cloud orchestrator 318 may attempt to extract at least one of the VIP address I, unique authentication code U, or any other identifiers from the PXE boot request, and use this information for querying the internal database 322 to determine if there is a reservation R having matching information. If a reservation R having matching information cannot be located, cloud orchestrator 318 may deny the boot request and instruct the virtualization platform 334 to terminate the Measured VM 342. For instance, if the VIP address I or the authentication code U are incorrect and/or there is no such reservation in the internal database 322, the boot request may fail. If a matching reservation is located, cloud orchestrator 318 may pass the reservation R to the Secure/Trusted boot server 330 to continue establishment of the secure tunnel.

As such, attempting to match a unique authentication code U, specific VIP address I and/or other information from the original reservation R to create the Measured VM with information extracted from the PXE boot request permits cloud orchestrator 318 to authenticate each PXE boot request, and therefore protect against low effort attacks, such as accidentally or intentionally starting a measured VM in the cloud without a corresponding reservation.

With reference to element 9, upon being informed that a matching reservation R has been found, Secure/Trusted boot server 330 may complete the handshake to establish the secure tunnel (e.g., using transport layer security (TLS) protocol) with the Measured VM 342. As part of the handshake, Secure/Trusted boot server 330 may send to the Measured VM 342 a certificate signed by a specific certificate authority (CA) of the tenant. Upon receipt, the Measured VM 342 may verify that the certificate provided by the Secure/Trusted boot server 330 matches the constraints of its configuration information as specified by the virtualization platform 334. An example constraint may be that a certificate provided by the Secure/Trusted boot server 330 was signed by a Certificate Authority. If the certificate is acceptable, Secure/Trusted boot server 330 and the Measured VM 342 may agree on a session key that will be used to encrypt traffic over the secure tunnel. From this point forward, any communication between the Secure/Trusted boot server 330 and Measured VM 342 may be conducted using encrypted communications sent via the secure tunnel. Also, there may be additional layers of encryption to secure this tunnel. The encryption scheme described above is just one example, and does not limit use of other layers.

Advantageously, the secure tunnel may protect against a Man in the Middle (MiM) attack on any future communications between the Secure/Trusted boot server 330 and Measured VM 342. A MiM attack is an attack in which an intruder eavesdrops on and/or tampers with communications between two parties. Rather than communicating with each other directly, each of the two parties unknowingly communicates with the intruder, which controls the connections and relays messages between the communicating parties.

The secure tunnel, by itself, may not guarantee that the Measured VM 342 is authentic (e.g., that the measured VM is running on a virtualization platform 334 that is authentic, not tampered with and backed by a TPM 344). Cloud orchestrator 318 and/or Secure/Trusted boot server 330 may not send a workload to the Measured VM 342 for execution until after attesting to its authenticity. To do so, cloud orchestrator 318 and/or Secure/Trusted boot server 330 may confirm that code of an authentic not-tampered Measured VM BIOS function operates in an expected manner and may allow TLS connections with servers having a certificate issued by particular certificate authority (CA) as specified in configuration information of the virtualization platform 334.

With reference to element 10, once the virtualization platform 334 notices (or is notified) that a secure tunnel has been established between Measured VM 342 and Secure/Trusted boot server 330, virtualization platform 334 may retrieve from the Measured VM 342 a measurement of a secure tunnel session. For example, the Measured VM 342 may make a measurement of a TLS session key that can be provided to the virtualization platform 334. The process of how a session key is derived and agreed upon may depend on a specific protocol used to establish secure channel. For example, the TLS protocol describes how a session key may be derived.

Rather than letting the Measured VM 342 call an exposed API of the underlying virtualization platform 334 to provide the secure tunnel session measurement, the virtualization platform 334 may access a known memory location of the Measured VM 342 upon detecting that the secure tunnel has been established to obtain the measurement. The Measured VM 342 may also notify the virtualization platform 334 that the secure tunnel has been established (e.g., so that virtualization platform doesn't have to monitor all received traffic) and the virtualization platform 334 may then retrieve the secure tunnel session measurement from the Measured VM 342 (e.g., rather than the Measured VM pushing the measurement to the virtualization platform 334).

With reference to element 11, the virtualization platform 334 and the infrastructure 338 may then update one or more PCR registers within the TPM 344 with the secure tunnel session measurement (e.g., measurement for a TLS session key used to encrypt the traffic within the secure tunnel). Below is an example of updating a PCR register.

p:=TPM_PCR_Reset(p);
p:=TPM_Extend(p, Measurement(Secret_Key_for_Existing_TLS_Session))

By including the secure tunnel session measurement in the TPM 344, the endpoint of the secure tunnel may be tied to the virtualization platform 334 and the infrastructure 338 on which the platform 334 runs. The virtualization platform 334 may be measured and therefore may be verified to be authentic. An authentic virtualization platform 334 may be configured, in one example, to only allow a Measured VM 342 locally launched by the platform 334 to provide the secure tunnel session measurement established with the Secure/

Trusted boot server 330. An authentic virtualization platform 334 might not allow some remote entity (e.g., other software, remote VM, remote hypervisor) to interact with its hypervisor, which may manage the Measured VM. An authentic virtualization platform 334 may only allow a Measured VM locally created on the physical infrastructure 338 to use APIs of the hypervisor to work with the TPM 344 on the physical infrastructure 338. In other words, the hypervisor attestation/TPM related API may be local only and might not be used remotely.

Phase 3: Remote Attestation

At this point, the established secure tunnel may not extend all the way to the TPM 344. Instead, the network communication endpoint may be the BIOS of the Measured VM 342, which is part of the virtualization platform 334 that runs on top of the virtualization platform physical infrastructure 338 containing the TPM 344. For the TPM 344 to attest the authenticity and integrity of the Measured VM 342 and further protect communication between the tenant and the TPM 344, communication may be established between the cloud DMZ 306 all the way to the TPM 344.

To do so, a TPM transport session may be established and used as an information exchange mechanism to allow software running in the cloud DMZ 306 to specify requests in such a way that only a specific TPM 344 may execute them. Such requests may be encrypted using a shared secret established using a private key in the TPM 344 and a public key of the cloud DMZ 306. The boot server 330 may initiate establishment of a TPM transport session by sending an encrypted request to the Measured VM 342 using the secure tunnel.

With reference to element 12, the Secure/Trusted boot server 330 may establish a TPM transport session via the established secure tunnel and send a remote attestation request to the Measured VM 342. This request may be used to verify the authenticity of the virtualization platform 334 on which the Measured VM 342 is running, including some or all binaries, configuration settings and other software, hardware or configuration elements that are used to run the Measured VM. The remote attestation may be executed by sending a request to the Measured VM 342 to retrieve a TPM quote accompanied by a randomly generated nonce N. In an example, the authentication code U from reservation R may serve as the nonce. The TPM quote may incorporate the nonce N to protect against replay attacks. To further increase the security, the TPM quote request may be performed within the TPM transport session bound to a TPM 344 incorporated into the underlying infrastructure 338.

In an example, the TPM 344 may encrypt data sent via the TPM transport session using a TPM bound key. The TPM bound key may be tied to the AIK key of the TPM 344 (e.g., by nature of this encryption key being generated and certified by the AIK key). The TPM bound key may be specified by the cloud provider and included in the TPM inventory stored in the internal database 322. In another example, migration keys may be used to encrypt data of the TPM transport session. Migration keys, for example, may be generated by the tenant and then migrated and loaded to the TPM dedicated to the Measured VM. A migration key may be a key migrated from the tenant to the TPM 344 using features provided by TPM 344. An example process of key migration is described in the "TCG PC Client Specific Implementation Specification For Conventional BIOS, Version 1.20 Final, Jul. 13, 2005, For TPM Family 1.2; Level 2," referenced above. Key migration may allow use of tenant provided keys to encrypt the TPM transport session, rather than using key generated by a vendor, cloud provider or some other entity. The TPM Bound key or migration key may be used to establish a TPM transport session between the tenant and TPM 344 to encrypt the communication to retrieve the TPM quote.

With reference to element 13, the Measured VM 342 may locally forward requests to establish the TPM transport session and any request received in the session to the virtualization platform 334. Locally forwarding may refer to forwarding by means other than network communication so that the request is executed on the same host on which it was forwarded. Examples of local forwarding may include using interprocess communication, shared memory, interrupt, and the like. In an example, the Measured VM 342 may locally send a request to the virtualization platform 334 requesting a TPM quote for verifying the integrity and authenticity of the virtualization platform 334, the Measured VM 342, and the infrastructure 338. An authentic not-tampered with virtualization platform 334 may accept such requests only from the Measured VM 342 which was created on the virtualization platform 334 and to which the TPM 344 is currently dedicated. The virtualization platform 334 may send the request directly to the TPM 344, and only the TPM to which the request was directed may execute the request.

An authentic, non-tampered with, virtualization platform may guarantee that, only the VM that it created and is therefore local, can issue such request. Such a virtualization platform may prevent any other VM or other software running on the same or other computer, to issue such request to protect against Relay/Masquerading attacks. If other software or non-local VM could issue such request, it would be potentially possible that some remote piece of software pretending to be an authentic virtualization platform would retrieve the TPM quote and then forward it to the tenant as if the quote was produced on the platform running this malicious software.

With reference to element 14, the TPM 344 may produce a TPM quote using at least some of the measurements stored in its PCR registers. The TPM quote may uniquely attest to the authenticity and integrity of one or more of the virtualization platform 334, the configuration of platform 334, underlying software and hardware elements of platform 334, the Measured VM 342, configuration and any related binary elements of the Measured VM 342, the established secure tunnel, and the like. The TPM quote may also be based on nonce N. As noted above, the nonce may be a random number and the authentication code U generated by the tenant may serve as the nonce.

In an example, the TPM 344 may create the TPM quote as a function of a nonce, a set of one or more of the measurement values (e.g., software version, binary code, configuration information, hardware type, and the like) stored in the PCR registers, and the private key. The TPM 344 may combine the set of one or more stored measurements with the nonce, and then cryptographically sign the result of the combination with the private attestation identity private key (AIKpriv) to produce the TPM quote.

In a more detailed example, the TPM 344 may produce the TPM quote based on one or more core root of trust measurements (CRTM), BIOS (e.g., option ROMs, firmware), boot loader, virtualization platform 334 including any loadable or third party modules, VM BIOS (e.g., option ROMs, firmware), configuration files, measurements of configurations specific to the Measured VM 342, including, for example, the certificate/certificate authority and network address (e.g., URL) of the Secure/Trusted boot server 330, and a measurement of the secure tunnel (e.g., TLS session key) established between the Measured VM 342 and the Secure/Trusted boot server 330. If a TPM transport session is used, the Measured VM 342 may forward the local request to the virtualization platform 334 for encrypting the TPM quote using the TPM session key. The TPM 344 may also digitally sign the quote and nonce using its private attestation identity key (AIKpriv).

With reference to element 15, the Measured VM 342 may then forward, to the boot server 330 via the secure tunnel, the TPM quote and the public attestation identity key (AIKpub) corresponding to AIKpriv of the TPM 344 used to sign the quote.

With reference to element 16, Secure Trusted boot server 330 may forward the received TPM quote to cloud orchestrator 318 for authentication.

With reference to element 17, cloud orchestrator 318 may retrieve expected measurements from the internal database 322 as well as expected AIKpub of the TPM 344. Cloud orchestrator 318 may verify that the received AIKpub matches expected AIKpub stored in the internal database 322. As noted above, the cloud provider may identify an expected AIKpub for the TPM 344 as part of the key inventory stored in the internal database 322. Expected AIKpub may be, for example, pre-validated to ensure this key is TPM backed using standard processes to verify authenticity of AIKpub (e.g., using PrivacyCA, DAA, and the like).

After verifying that received AIKpub matches expected AIKpub, cloud orchestrator 318 may decrypt the TPM quote using AIKpub of the TPM 344 to obtain the set of one or more measurements combined with the nonce (e.g., authentication code U). Because the cloud orchestrator 318 knows the nonce, cloud orchestrator 318 may remove the nonce to obtain the set of one or more measurements. Cloud orchestrator 318 may then compare expected values for the set of one or more measurements with the values derived from the TPM quote. If the AIKpub, nonce and measurements match, cloud orchestrator 318 may deem the Measured VM 342, the virtualization platform 334, and the infrastructure 338 on which the platform 334 is running to be authentic, not tampered with, and configured as expected, and may indicate that a workload may be delivered from the tenant to the Measured VM 342 using the established secure tunnel. If mismatch is detected, cloud orchestrator 318 may abort the boot request and request the virtualization platform 334 to terminate the measured VM 342.

Cloud orchestrator 318 may deem the Measured VM 342, the virtualization platform 334, and the infrastructure 338 to be authentic because the Measured VM 342 may not communicate with anybody else but tenant's Secure/Trusted boot server 330, as proven by the measurements. Further, Secure/Trusted boot server 330 may ensure that there is only one secure tunnel per VIP address I, authentication code U, reservation R, and secure tunnel measurement (e.g., measurement of TLS session key). Moreover, a signed measurement of the secure tunnel is part of the TPM quote received from the Measured VM 342, which means the Measured VM 342 runs on a TPM 344 that produced that signature, as there may not be a way to inject the value of the secret key (e.g., TLS session key) for the TLS session into an authentic TPM running and authentic platform. As the last step of the PXE boot sequence, the boot server 330 may deliver the tenant's bootloader and workload to the verified Measured VM 342 using the established secure tunnel.

Phase 4: Delivery of Workload

With reference to element 18, once the Measured VM 342 is deemed to be authentic, the Secure/Trusted boot server 330 may deliver, using the established secure tunnel, a bootloader and a workload to the Measured VM 342 for execution.

With reference to element 19, once the bootloader is delivered and the Measured VM 342 is ready to boot, the Measured VM 342 may notify the virtualization platform 334 about handing over control to the delivered bootloader. Measured VM 342 may then start executing instructions specified in the bootloader. After the Measured VM 342 boots, the virtualization platform 334 may release the TPM 344 so that is it no longer exclusive to this Measured VM 342, instructing the TPM 344 to reset all the PCR registers that are populated with values specific to this Measured VM 342. From this time forward, the TPM and the virtualization platform 334 may be used to start and attest to another Measured VM. Release of the TPM may be related to the TPM being physically-based and not virtual. If the TPM is virtual, releases might not be required.

Since there are many Measured VMs 342A-C and the TPM 344 is not virtualized, the creation of Measured VMs may be serialized until authenticity of the virtualization platform 334 is confirmed or denied. When Measured VM creation with VM BIOS set to secure boot is initialized, no other such VM may use TPM 344 or be created until the TPM quote for this Measured VM is obtained to ensure that the TPM is in a known state (e.g., VM related TPM resources are exclusively allocated to this Measured VM). Once VM creation is complete (e.g., the boot loader is delivered), the PCR storing measurements of a particular VM state can be reset, the TPM may be released, and a next Measured VM requiring secure booting may be created. To ensure that a malicious boot server or technical difficulties do not prevent permanent block on creation of VMs with secure boot, a configurable timer may be used. If the time expires before the Measured VM 342, virtualization platform 334, and infrastructure 338 have been authenticated, cloud orchestrator 318 may determine that the virtualization platform 334 is not authentic and abort the boot request. Although the elements of FIG. 6 have been described using a measured VM, one of skill in the art after review of the entirety disclosed herein will appreciate that portions of the examples of FIG. 6 may be performed using non-measured VMs with appropriate modification to steps and apparatuses involved. For example, steps diagramed in FIGS. 10A and 10B and apparatuses illustrated in FIGS. 12A and 12B are contemplated and may be substituted in the examples of FIG. 6 with a non-measured VM.

The example embodiments provide for using a PXE boot mechanism as a communication channel between a virtualization platform 334 and a tenant for attestation of the virtualization platform 334. Further, inclusion of a secure tunnel measurement as part of measurements of the virtualization platform may solve the problem of associating particular physical infrastructure 338 to a specific TPM 344 to protect against Man-in-the-Middle and Relay attacks. This approach may also provide a novel approach to the issue of limited TPM resources and support multiple tenants by not requiring virtualization of the TPM. The virtualization platform 334 may be the only element that needs access to the TPM 344 and may use the TPM efficiently by sequentializing the creation of Measured VMs.

The example embodiments further provide protection against introduction of public keys of a rogue TPM (e.g., valid non-tampered TPM belonging to a platform owned by an attacker). A TPM may provide anonymity and the keys presented by the TPM cannot be directly tied to physical infrastructure that contains the TPM. The risks introduced by this design are mitigated by two factors. As discussed herein, the cloud provider may maintain a listing of valid AIK keys and their corresponding physical infrastructure in a key inventory which is shared with the tenant. To introduce a rogue TPM to the physical infrastructure 338, an attacker may have to physically interconnect the rogue TPM with the platform physical infrastructure 338, and introduce keys belonging to the rogue TPM to the key inventory maintained by the cloud provider.

The second mitigating factor is based on the measurements of software and configuration information. Even if such rogue TPM (but otherwise valid, not tampered with, correctly functioning) TPM is introduced to the physical infrastructure 338, a tenant may refuse to use the physical infrastructure unless it runs authentic, not tampered with, and correctly configured software. A correctly functioning TPM is expected to provide measurements that can be trusted. Measurements would either prove that the physical infrastructure 338 incorporating a rogue TPM runs authentic correctly configured software (and therefore the rogue TPM most likely has not been included in the inventory provided to the tenant) or is running modified or misconfigured software. The rogue TPM therefore would fail authentication either by not being included in the inventory, or by running modified or misconfigured software.

Migration

In an example embodiment, the Measured VM 342 might be prevented from migrating to different physical structure than the physical infrastructure 338 on which the Measured VM is running. As noted above, a specific TPM integrated in the physical infrastructure 338 running a virtualization platform 334 that created the Measured VM may attest to the authenticity of the Measured VM. Because attestation of the Measured VM is tied to a specific TPM, the Measured VM might be prevented from migrating to different physical infrastructure. This is because a measurement of the different physical infrastructure would differ from a measurement of the physical infrastructure 338.

Further, a Measured VM may only be attested to a single time during a PXE boot sequence (e.g., before tenant's workload is delivered to the Measured VM). Because there might not be a follow up attestation once the Measured VM is running, the virtualization platform 334 and physical infrastructure 338 hosting the Measured VM might not be permitted to change at all. For example, the following might not be permitted to change: any binaries, configuration, loadable modules, firmware, certificates, and the like. To change any of the elements of the virtualization platform used to run the Measured VM, the Measured VM on that platform may have to be shutdown prior to making any change to the virtualization platform. Otherwise, authentication of the Measured VM may be revoked.

Software

The software operating in the cloud environment may be grouped into about three main categories and/or subcategories. The first category may include software providing the virtualization platform 334 used to run workloads in the cloud. This software may be supplied by a software vendor independent from the cloud provider; and may be deployed, reviewed and tested independently from the cloud environment. The second category may include software providing and managing the access to the cloud environment, mainly to the virtualization platform 334 and resources on which the platform 334 runs. Software in the second category may be supplied and developed internally by the cloud provider, may be proprietary, and/or might not be available for examination outside of the cloud environment. The third category may include software deployed by tenants to run as a workload on the cloud.

Protection against software based attacks may be based on any modification to the software used to execute a workload. Such modifications may be manifested in measurements of the software, and the modifications may be detected outside of the cloud environment by measuring of the virtualization platform 334 by the tenant. The expected measurements for a trusted virtualization platform can be established during such in house testing. If an attacker either modifies the software or includes unauthorized software as part of the virtualization platform (e.g., as a loadable module, measured by its trusted loader), a measurement representing the platforms will differ from an expected measurement. The remote attestation protocol discussed herein may deliver these invalid measurements as part of the TPM quote and tenant's Secure/Trusted boot server 330 may prevent use of such altered virtualization platform.

Configuration

The configuration parameters used by the virtualization platform 334 may have an impact on security. Each Measured VM is configured to verify the authenticity of a certificate presented by the Secure/Trusted boot server 330 against a preconfigured certificate/certificate authority. In addition, each Measured VM is configured with specific network address (e.g., URL) at which it should contact the Secure/Trusted boot server 330.

Additional parameters specific to the virtualization platform 334 (e.g., list of loadable modules) may have security implications as well. For instance, an attack based on configuration information might be based on changing configuration information to let the virtualization platform 334 connect to an impostor rather than to an expected tenant. The example embodiments may provide protection against a configuration-based attack similar to how protection is provided against a software-based attack. Configuration information may affect trustworthiness, and security parameters may be included in measurements used for attestation of authenticity of the virtualization platform 334. Once measurements have been received from the TPM, the tenant may determine measurements of a configuration of the virtualization platform 334 match an expected configuration, in the manner provided above, to determine whether to authenticate the platform 334.

Network

One way to access resources provided by the cloud platform is over a computer network. Lack of physical access to the platform physical infrastructure 338 represents a significant challenge for a tenant to establish trust in a virtualization platform 334. To execute an attack over the network, an intruder may have to first gain access to the network. Several approaches described herein limit unauthorized access to the network between the tenant and the platform physical infrastructure:

First, the cloud provider and the tenant may deploy a network access control mechanism (e.g., based on an IEEE 802.1X standard) where each device connecting to the network may be authenticated (e.g., using a digital certificate issued by the network owner). Second, the tenant may operate within the cloud environment on a dedicated VLAN. Third, a tenant's internal as well as the virtual environments are protected by physical and/or virtual firewall. Since a tenant controls what resources are active within the cloud environment at any given moment, dynamically modified firewall rules can tightly control exactly what devices (e.g., IP addresses, MAC addresses) may communicate at any given moment and how (e.g., protocol). Lastly, the tenant and the cloud provider may use a private encrypted connection (e.g., private circuit, site-to-site VPN) with strict filtering and authentication rules to cross connect the tenant data center 302 and the cloud provider data center 304. If the intruder still manages get access to the cloud provider data center 304, two additional mechanisms may be used to protect communication between the tenant and the cloud infrastructure 310 when establishing trust in the virtualization platform 334.

A first type of attack that the example embodiments may protected against is referred to as a Man in the Middle attack.

The Man in the Middle attack may be an attack in which an intruder eavesdrops and/or tampers with communication between two parties. Rather than communicating with each other directly, each of the two parties unknowingly communicates with the intruder, which controls the connections and relays the messages between the communicating parties. To execute a Man in the Middle attack on the above embodiments, the intruder would have to eavesdrop and control the connection between the Secure/Trusted boot server 330 and the Measured VM 342. The example embodiments protect against such an attack by using a secure tunnel (e.g., TLS) between the communicating parties, where the channel is established after certificates of the communicating parties have been validated. Executing a Man in the Middle attack on a TLS protected connection used for online commerce is highly unlikely. In addition, the example embodiments may utilize another encrypted tunnel (e.g., TPM transport session) within the secure tunnel established using TLS protocol. The inner encrypted tunnel may be established using a TPM transport session mechanism and may be established directly between the Secure/Trusted boot server 330 and the TPM 344 executing the commands used to produce the TPM quote.

A second type of attack that the example embodiments may protect against is referred to as a Relay attack. A Relay attack is attack in which intruder poses as a valid cloud provider system potentially by relaying responses from a valid cloud provider system. A Relay attack can be viewed as special type of MiM attack. To execute a relay attack on the example embodiments, an intruder would have to relay the results provided by the valid virtualization platform 334 to the Secure/Trusted boot server 330 to make the Secure/Trusted boot server release the tenant's bootloader code to the intruder. The example embodiments may protect against this type of attack by using the two mechanisms already mentioned in the discussion on MiM attacks. Further, by making measurements of the outer secure tunnel (e.g., TLS) between the Secure/Trusted boot server 330 and the Measured VM 342 part of the measurements of the Measured VM, the example embodiments may verify that the cloud endpoint of the secure tunnel (e.g., the virtualization platform physical infrastructure 338) does in fact incorporate the TPM 344.

A third type of attack that the example embodiments may protect against is referred to as a "combined attack." A combined attack may include a combination of the network attack and the configuration-based attack, discussed above. To execute a combined attack, an intruder would have to modify, tamper with, or misconfigure software of the virtualization platform 334. Modification of code or configuration of the virtualization platform 334 would be detectable by the tenant since the modification would be present within the TPM quote. Correct measurements may be obtained only on unmodified and correctly configured virtualization platform 334 that would not communicate with the intruder.

In accordance with various aspects of the disclosure, a system may include, in some examples, the ability to capture and log the success/failure of each boot operation and report on it using monitoring tools which monitor VMware environments. The success criteria may include, for example, logging hash of each downloaded component to document what has been run. The error criteria may include, for example, every attempt to connect to a server which failed every authorization, authentication and/or verification issues, and the like. By obtaining logs and reports with the results of internal and external monitoring, the system may obtain insight into events that take place within the cloud provider physical infrastructure 304 as well as within the tenant-controlled cloud DMZ 306 environment dedicated to the organization.

By analyzing these logs individually, the system may be able to immediately detect events that may signal anomalous or unauthorized activity in the environment, either due to unexpected use of the environment, misconfiguration and/or attempts to breach the security perimeter of the environment. Examples of types of events include, but are not limited to: IP and MAC address conflicts; unexpected protocols or ports being used—all traffic within the environment may be encapsulated in one of the secure protocols, such as SSL, IPSec, and the like; unauthorized attempts to gain access through one of the firewalls or through the secure gateway device; unauthorized attempts to plug in network devices to existing physical infrastructure; unauthorized attempts to gain access to the portal or to invoke API functionality; unauthorized attempts to modify configuration of physical devices or to modify files (such as OS templates) hosted within the cloud provider environment; unauthorized processes running within VM instances in the cloud; and/or other types of events.

Furthermore, a potential additional strength in securing the cloud environment (e.g., virtual private cloud 308) may be a result of comparing and cross-referencing the collected logs with the internal logs describing the expected state of the environment. Examples of logs, include, but are not limited to: secure gateway logs, internal cloud DMZ firewall logs, IDS/IPS logs, HTTPS server logs, network scan logs, network access control logs, instance access logs, host intrusion detection logs, virtual and physical firewall logs, hypervisor level logs, secure boot logs, environment monitoring logs, API and portal usage logs, and other types of logs, such as described in U.S. Provisional Patent Application No. 61/476,747. The assumption may be that the cloud environment (e.g., virtual private cloud 308) may be exclusively managed by a cloud orchestrator 318 on behalf of the organization and tasks submitted to be deployed to the cloud. The cloud orchestrator 318 may have detailed knowledge of what assets should be present in the cloud environment 304 at any given moment, what should be the state of the assets, and/or what are the expected types of actions or communications the assets may be performing. This detailed knowledge may be useful when securing the cloud environment (e.g., virtual private cloud) compared to an environment providing unsecured remote access to the internal infrastructure. By comparing and correlating the cloud orchestrator logs describing expected state of the environment with logs obtained via internal and external monitoring, we may be able to detect events such as: (1) attempts to create or clone VM instances out of contexts. The cloud orchestrator 318 may be the only entity able to create or clone VM instances. Any instance appearing in the environment not present within the cloud orchestrator logs may represent an anomalous event; (2) attempts to run VM instances out of context. The cloud orchestrator 318 may be the only entity able to power on the VM instances, and each VM instance may follow a strict protocol of how a bootable code is delivered to it in order to run it. Any attempt to run an instance and obtain access to the bootable code out of context may represent an anomalous event. Also, any attempt to run an instance without requiring access to the bootable code (e.g. by supplying unauthorized boot loader) may represent an anomalous event; (3) attempts to gain access to the VM instances out of context. The cloud orchestrator 318 may be the only entity able to startup VM instances, connect to them during the startup phase in order to perform disk encryption initialization, and/or deliver keys to allow secure tunnel creation. Any connection attempt that doesn't match cloud orchestrator logs may represent an anomalous event; and (4) attempts by VM instances to gain access to the cloud DMZ 306 and the organization's network 302 out of context. The VM instances may follow a strict protocol addressing when attempts to create a secure tunnel to the cloud DMZ 306 (and gain access to network 302) are allowed. Any attempt that doesn't match the cloud orchestrator logs describing the expected state of the VM instance may represent an anomalous event. For example, if a given phase (e.g., create phase, boot phase, unlock phase, connect phase, and the like) doesn't finish within a predetermined threshold (e.g., a time duration threshold), then the cloud orchestrator 318 (or secure boot server 1204) may determine that an anomalous event has occurred and abort the process (e.g., sending instructions to abort the process, deleting/designating the reservation as void, denying the request for components, and/or other cautionary actions). In one example involving the create phase, the start of the phase may be triggered by the recording of the first token in association with a reservation, and the end of the phase may be triggered by the receipt of the first token from cloud DMZ 306. If the time duration of the create phase exceeds the threshold, an entry may be recorded in a log file (e.g., recording the identity of the source, destination, time, date, and other information) and the process aborted to prevent possibly malicious activity. Although the create phase is described here, one skilled in the art after review of the entirety disclosed herein, will recognize that the disclosure contemplates a threshold value (i.e., a different value may be designated for each phase or multiple phases may share a value) for the other phases of the process; FIGS. 10A and 10B and FIGS. 11A and 11B identify various illustrative phases and steps occurring in those phases. In addition, as described above with respect to external firewall 328 and internal firewall 326, dynamic rules may be used to set and enforce thresholds (e.g., time duration thresholds) for communication between the VPC 308 and the organization network 302 and secure cloud zone 306.

Nevertheless, the monitoring of the environment and correlation of the data from the environment with the expected state might not offer a complete picture of the security of the environment without the ability to audit the results of such monitoring. In case of monitoring and attempting to discover anomalous or unexpected events, the lack of such discovery may not amount to absolute proof that such events didn't occur, since what may have happened is that the monitoring may have failed or was otherwise inadequate to discover these events. To allow verification of the accuracy of log results, anomalous events may be injected in a controlled yet random way to the environment, and it may be verified that these injected events are correctly detected and reported. These types of anomalous injected events may include, for example: attempts to manually or out of context create or start VMs; attempts to create VMs based on unauthorized template; attempts to modify a template in an unauthorized way; attempts to deliver an unauthorized boot loader to the VMs or run the VMs in an unauthorized way, e.g. by attaching unauthorized boot loader to the VM; attempts to connect to the VMs in an unauthorized way, e.g. with an incorrect account or certificate, with an unauthorized client, from an unauthorized source, or using multiple attempts to authenticate; attempts to connect to the cloud DMZ 306 in an unauthorized way, e.g. with an incorrect certificate, with an unauthorized client, from an unauthorized source, and/or using multiple attempts to authenticate; attempts to communicate or access resources using an unauthorized protocol; attempts to deploy and/or run unauthorized code within the VMs; and/or other types of anomalous events.

Figure 7:
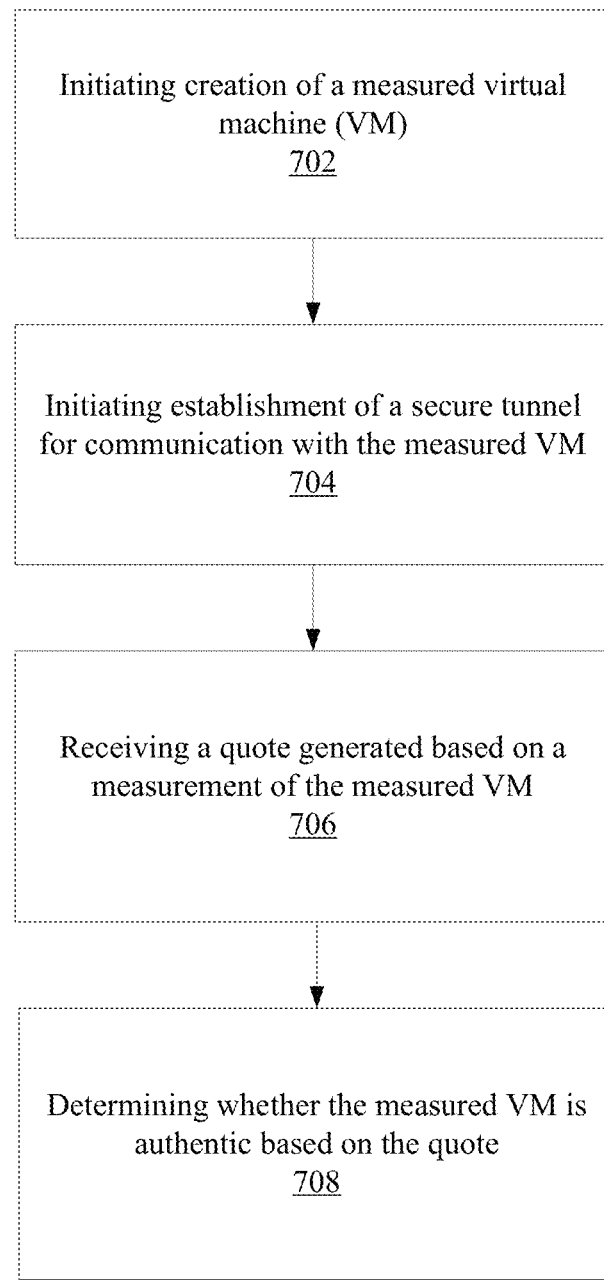
FIG. 7 illustrates an example flow diagram of a method for determining authenticity of a measured virtual machine (VM), in accordance with example embodiments.

FIG. 7 illustrates an example flow diagram of a method for determining authenticity of a measured VM, in accordance with example embodiments. The method may be performed by a single apparatus such as, for example, a computer, server, or other computational device. For example, the method may be implemented by a single apparatus (e.g., computer) performing the functions of the cloud orchestrator 318, boot server 330, and internal database 322, discussed above. The order of the blocks shown in FIG. 7 is an example. The blocks may be arranged in other orders, each a function described in each block may be performed one or more times, some blocks may be omitted, and/or additional blocks may be added. The method may begin at block 702.

In block 702, the method may include initiating creation of a Measured VM. For example, cloud orchestrator 318 may initiate creation of a Measured VM 342, as described above in elements 1-2 of FIG. 6.

In block 704, the method may include initiating establishment of a secure tunnel for communication with the measured VM. For example, the cloud DMZ 306, including the cloud orchestrator 318 and the boot server 330, may establish a secure tunnel with the Measured VM 342, as described above in elements 6-9 of FIG. 6.

In block 706, the method may include receiving a quote generated based on a measurement of the Measured VM. For example, the cloud DMZ 306, including the cloud orchestrator 318 and the boot server 330, may receive a TPM quote from the Measured VM, as described above in element 15 of FIG. 6.

In block 708, the method may include determining whether the Measured VM is authentic based on the quote. For example, the cloud DMZ 306, including the cloud orchestrator 318 and the boot server 330, may process a TPM quote to determine whether Measured VM 342 is authentic, as described above in elements 16-17 of FIG. 6. The method may end, or may return to any of the preceding steps.

Figure 8:
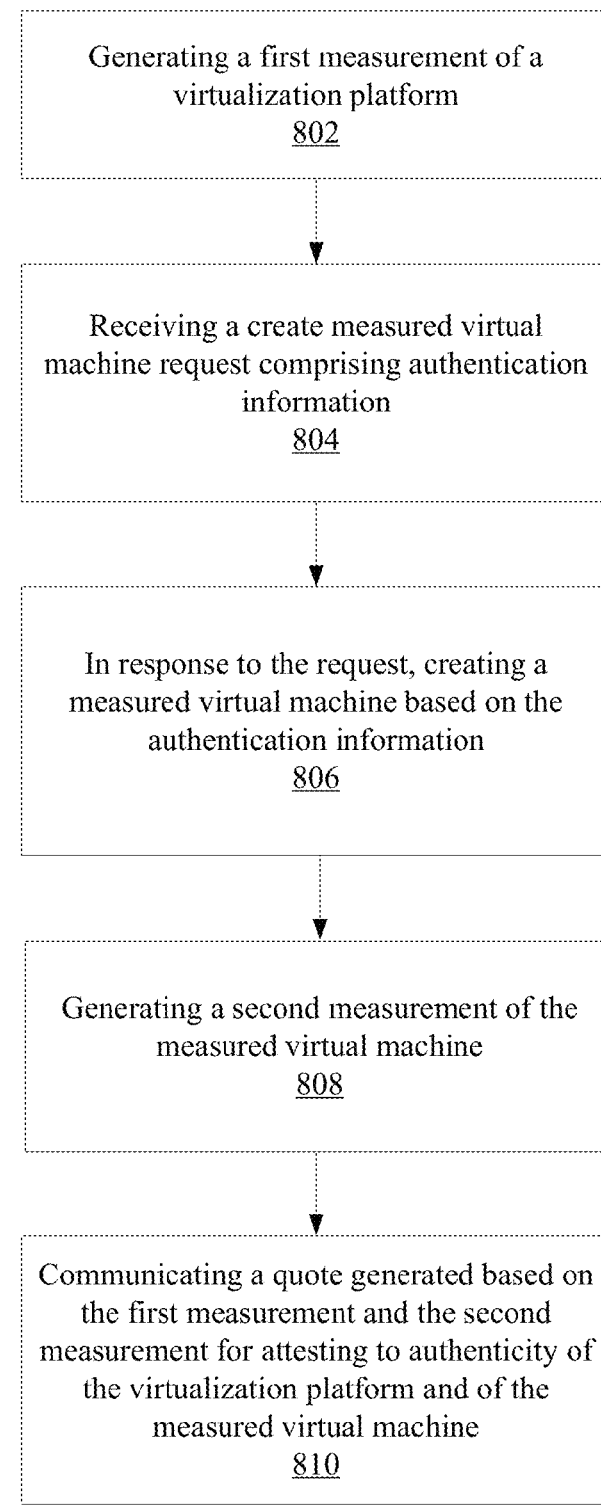
FIG. 8 illustrates an example flow diagram of a method for measuring a virtualization platform and a Measured VM in a cloud computing environment, in accordance with example embodiments.

FIG. 8 illustrates an example flow diagram of a method for measuring a virtualization platform and a Measured VM in a cloud computing environment, in accordance with example embodiments. The method may be implemented by a single apparatus such as, for example, a computer, server, or other computational device. For example, a single apparatus (e.g., computer) may perform the functions of the cloud platform 332, the virtualization platform 334, and the virtualization platform physical infrastructure 338. The order of the blocks shown in FIG. 8 is an example. The blocks may be arranged in other orders, each a function described in each block may be performed one or more times, some blocks may be omitted, and/or additional blocks may be added. The method may begin at block 802.

In block 802, the method may include generating a first measurement of a virtualization platform. For example, the virtualization platform 334 may store various measurements values in a TPM 344, as described above in element 0 of FIG. 6.

In block 804, the method may include receiving a create measured virtual machine request comprising authentication information. For example, the virtualization platform 334 may receive a request, which includes an authentication code U, to create a Measured VM 342, as described above in elements 2-4 of FIG. 6.

In block 806, the method may include, in response to the request, creating a measured virtual machine based on the authentication information. For example, the virtualization platform 334 may create a Measured VM 342 based on the authentication code U, as described above in element 5 of FIG. 6.

In block 808, the method may include generating a second measurement of the measured virtual machine. For example, the virtualization platform 334 may generate measurement values based on measuring the Measured VM 342, as described above in element 4 of FIG. 6.

In block 810, the method may include communicating a quote generated based on the first measurement and the second measurement for attesting to authenticity of the virtualization platform and of the measured virtual machine. In a further example, the quote may be generated based on a third measurement of a secure tunnel. For example, virtualization platform 334 may instruct the TPM 344 to generate a TPM quote based on one or more measurements stored in the PCRs, and may cause the TPM 344 and Measured VM 342 to deliver the TPM quote to the boot server 330, as discussed in elements 14-15 of FIG. 6. The TPM quote may be used for attesting to integrity and authenticity of the virtualization platform 334, of the Measured VM 342, and optionally of the physical infrastructure 338. The method may end, or may return to any of the preceding steps.

Figure 9:
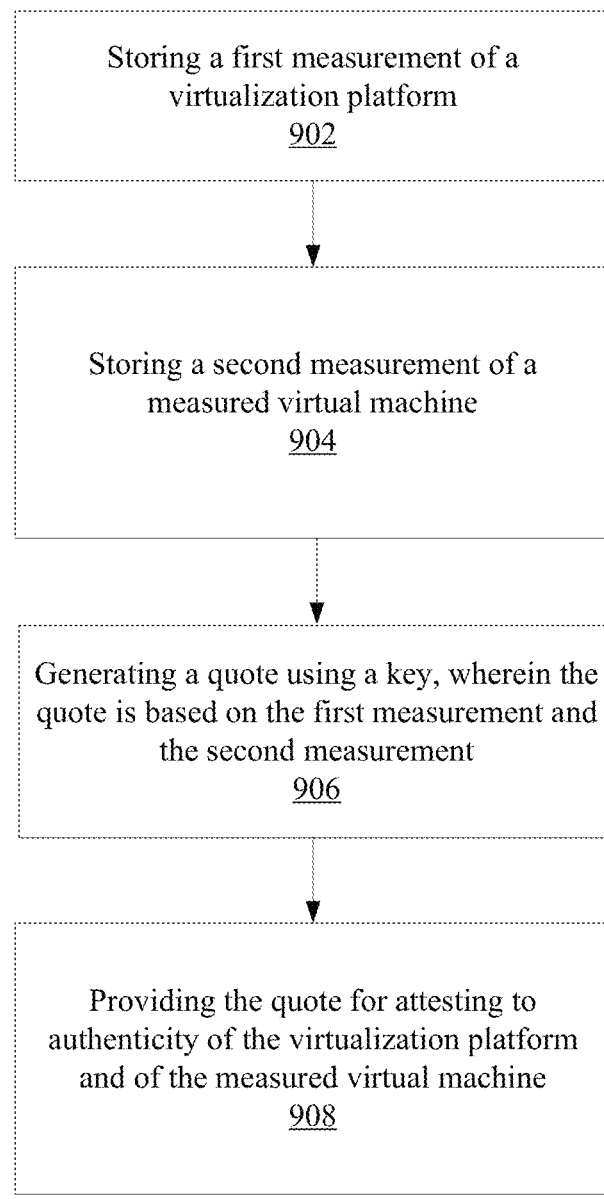
FIG. 9 illustrates an example flow diagram of a method for providing a quote for attesting to integrity and authenticity of a virtualization platform and of a measured virtual machine, in accordance with example embodiments.

FIG. 9 illustrates an example flow diagram of a method for providing a quote for attesting to integrity and authenticity of a virtualization platform and of a measured virtual machine, in accordance with example embodiments. The method may be implemented by a single apparatus such as, for example, a computer, server, or other computational device. For example, a single apparatus (e.g., computer) may perform the functions of the TPM 344. The order of the blocks shown in FIG. 9 is an example. The blocks may be arranged in other orders, each function described in each block may be performed one or more times, some blocks may be omitted, and/or additional blocks may be added. The method may begin at block 902.

In block 902, the method may include storing, by trusted hardware, a first measurement of a virtualization platform. For example, virtualization platform 334 may communicate one or more measurement values of platform 334 to the TPM 344 for storage in one or more PCRs, as described above in element 0 of FIG. 6. In a further example, the first measurement of the virtualization platform may be of at least one of physical hardware, low level software (e.g., BIOS, boot loader, and the like), tenant independent platform binaries and configuration.

In block 904, the method may include storing a second measurement of a measured virtual machine. For example, virtualization platform 334 may make and communicate one or more measurement values of a Measured VM 342 to the TPM 344 for storage, as described above with reference to element 4 of FIG. 6. The second measurement of the virtualization platform may include, for example, a measurement of at least one of a binary, configuration information, a cryptographic key, a digital certificate, a driver, a module, as well as of other information. In a further example, the second measurement may be of tenant dependent platform binaries and configuration. TPM 344 may also store additional measurements, such as, for example, a third measurement of a secure tunnel (e.g., a measurement of a symmetric encryption key used by TLS). In a further example, the third measurement may also serve as the nonce.

In block 906, the method may include generating a quote using a key, wherein the quote is based on the first measurement and the second measurement. For example, the TPM 344 may generate a TPM quote, as described above with reference to element 14 of FIG. 6. In a further example, TPM 344 may generate the quote based on the third measurement of a secure tunnel.

In block 910, the method may include providing the quote for attesting to authenticity of the virtualization platform and of the measured virtual machine. For example, the TPM 344 may generate provide a TPM quote to the Measured VM 342 that delivers the quote to the boot server 330, as described above with reference to element 15 of FIG. 6. The method may end, or may return to any of the preceding steps.

Referring to FIGS. 10A and 10B, those flow diagrams illustrate examples of various communications between a cloud DMZ, cloud provider including a virtual private cloud (VPC), and/or a company's network in accordance with various aspects of the disclosure and as illustrated in the "Example of Cloud Instance Deployment and Startup Process" diagram from U.S. Provisional Patent Application No. 61/476,747. VM instances in the VPC 308 may be started using a secure network boot process by delivering a unique boot loader from, in one example, the cloud DMZ 306 over a secure encrypted channel (e.g., HTTPS, SSH protocols using SSL/TLS technology, VPN, and the like) to the instance and verifying the authenticity and integrity of the instance through a series of steps. Only when the cloud VM instance passes the initial audit, the passphrase to initialize the transparent disk encryption may be delivered from the organization to the instance through a uniquely authenticated secure channel. The same channel may also be used to deliver to the cloud instance organization-issued digital certificate that, in the next step of the startup process, may be used, in some examples, to establish a secure tunnel back to the cloud DMZ 306 and/or organization computer network 302. In some embodiments, none of the delivered keys and certificates are stored on a local disk; they may only exist in memory while the VM instance is running. It may be that the secure tunnel is established only if the cloud instance passes additional audit. The secure tunnel may allow the instance to access the organization's own network and resources located either in the cloud DMZ 306 or elsewhere in the organization 302 over a network connection that may transparently encrypt all information transmitted through it. This may allow for data stored in the cloud or transmitted over the network in the cloud to be fully encrypted, with possibly the only unencrypted element being the memory of the running instance. Once the cloud instance is fully operational, it may execute workload that is delivered to it using standard organization infrastructure over the secure tunnel.

Figure 11A:
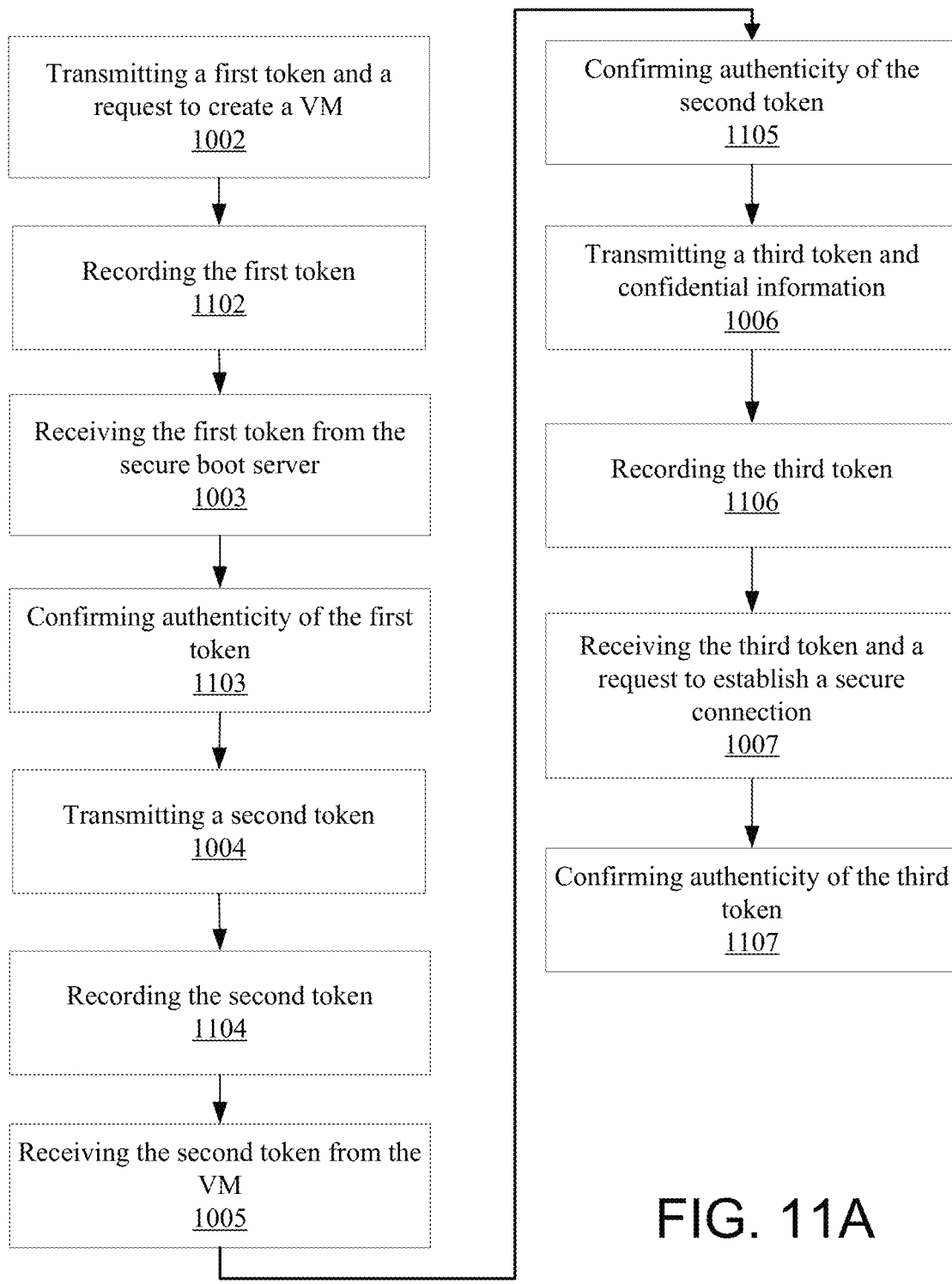
FIGS. 11A and 11B illustrate example flow diagrams for securely loading and booting an operating system image on a virtual machine instance in a cloud computing environment, in accordance with example embodiments.
Figure 11B:
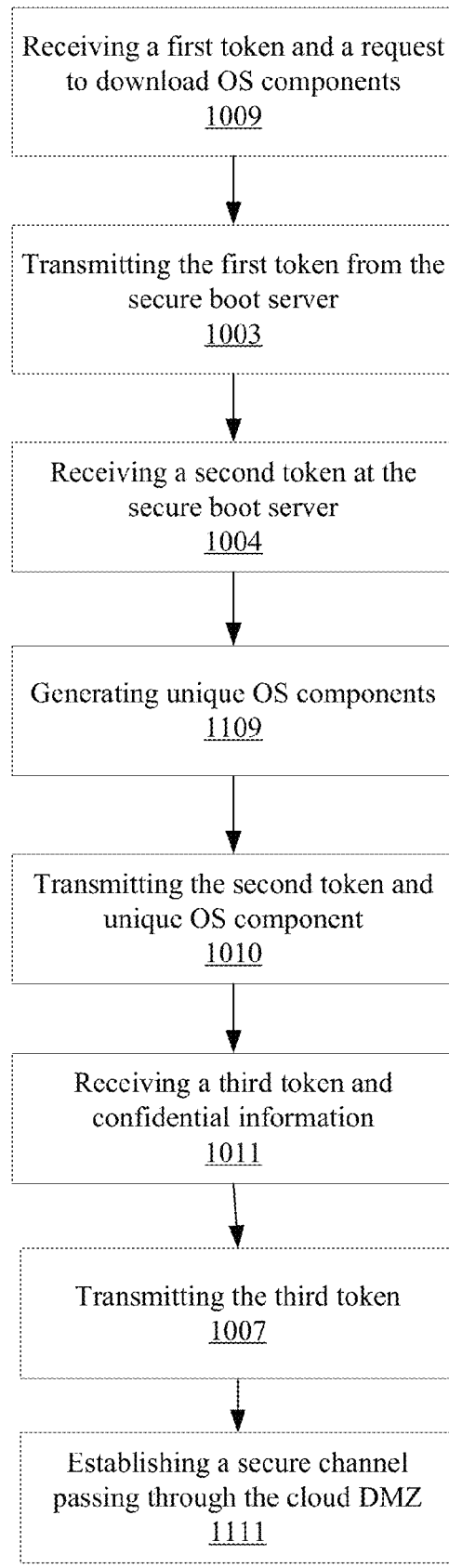

Referring to FIGS. 11A and 11B, which correspond to the interactions depicted in FIGS. 10A and 10B, in advance of step 1002 (i.e., 1002A and 1002B), an organization may, in one example, provide an encrypted operating system (OS) image template to a cloud provider data center 304 for storage. The organization may securely transmit and store an encrypted OS template and/or other components at a cloud DMZ 306 (e.g., at secure boot server 1204) within the cloud provider data center 304. In step 1002B, the cloud platform 332 may use a virtualization platform 334 to instantiate a VM 342A (e.g., non-measured VM or measured VM) according to at least some unique data elements in the request, similar to as described above in the "Creating a Measured VM" section in the examples of FIG. 6 (see e.g., elements 1-3 and 5 of FIG. 6). The newly created VM 342A may be an empty shell, or alternatively, the VM 342A may contain a fully encrypted operating system (OS) or other software which required unlocking/decrypting before it can be executed. In one example, similar to that described with respect to element 5 of FIG. 6, the secure boot server 1204 may deliver bootable components to the VM 342A that enables the VM to decrypt and boot the fully encrypted OS. The secure boot server 1204 (or other device) may supply encryption keys and/or passphrases to initialize the disk encryption/decryption mechanism to unlock/decrypt and initialize the OS so that a bootloader may transfer control and execute the OS.

In addition, the organization network 302 (e.g., cloud orchestrator system 318) may allocate a reservation to the request and record (see step 1102) a first token associated with the newly created VM instance. The reservation may contain unique data elements (e.g., a unique token, specific networking settings such as Mac address, IP address, other identifiers such as those described with reference to elements 2-3 of FIG. 6, and the like) At least one benefit of the aforementioned includes verification that the VM instance 342A was created by an authorized entity. The first token may serve as a nonce for associating a request to create a VM with a request that the VM later sends to the tenant's secure boot server 330 to download the desired components to boot the newly created VM. Since the cloud orchestrator system 318 provided the unique data elements that were sent to the cloud provider in a request to create a VM, the system expects to receive communication from the location (e.g., IP address) indicated in the specific network settings it provided, and which are associated with the reservation.

In step 1002, the organization network 302 may submit a request (see step 1002A) to the cloud provider infrastructure 310 to create a VM instance 342A in the VPC 308. The cloud provider may (in step 1002B) invoke methods on a virtualization platform (e.g., HTTPS API) to start (e.g., create) the new encrypted VM instance 342A in the VPC 308. In addition, a first computing system (e.g., a cloud orchestrator system 318 at cloud zone 306 and/or organization network 302) may transmit (see step 1002A) via an encrypted channel a first token to a second computing system (e.g., computing system 334 in communication with VPC 308). In one example, the organization network 302 may transmit the first token to the cloud zone 306, which then transmits the first token to a computing system in the cloud infrastructure 310. The computing system 334 may instruct (see step 1002B) the VPC 308 to power on the VM instance 342A by starting the VM, which starts the VM BIOS, which invokes a custom PXE loader, as described herein. The custom PXE loader may trigger a secure boot process in order to load an operating system and/or other components. A custom PXE loader in the VM 342A at VPC 308 may send (see step 1009) a secure (e.g., HTTPS) request to the cloud DMZ 306 to load operating system components (e.g., system kernel and/or custom initial ramdisk) or other components. The request may also include the first token that was originally sent in step 1002.

In step 1003, the cloud zone 306 (e.g., secure boot server 1204) may send the first token to organization network 302 (e.g., cloud orchestrator system 318) to verify that the first token from the VM instance is authorized. In addition, the cloud zone 306 may communicate information to the organization network 302 to identify the OS components (e.g., kernel and/or ramdisk) to provide to the VM instance. The organization network 302 may communicate with an internal database to access the reservation stored on it, to verify (see step 1103) the first token, and/or to retrieve the location of the unique OS components and/or other components. In addition, the cloud orchestrator system 318 may record (see step 1104) a second token in association with the request for the virtual machine (e.g., the reservation) as was done for the first token. The organization network 302 may communicate with the internal database to update the reservation for the virtual machine instance based on this information.

Upon confirmation of the authenticity of the request, the cloud orchestrator system 318 may transmit (see step 1004) the second token to the secure cloud zone 306 (e.g., secure boot server 1204). As a result, the secure cloud zone 306 may provide unencrypted OS components (and/or other components) over a secure channel (e.g., HTTPS) to the VM instance 342A at the VPC 308 (see step 1010), similar to as described with reference to element 5 of FIG. 6. The components may include communications server software components, host integrity detection software components, and/or other components. The communications server software may enable the VM to create and receive SSH (or other secure or non-secure) communication channels, which may be used to communicate with the secure cloud zone 306 and/or organization computer network 302. The secure boot server 1204 may also provide the second token to the VM instance 342A at the VPC 308. The VM instance 342A may, as a result of the secure boot process, start booting the virtual machine instance with the received and/or unlocked components. In an alternate example, the secure cloud zone 306 may generate (see step 1109) unique OS or other components by, for example, patching one or more of the stored OS (or other) components using approved organization processes, such that unique components may be recreated in a secure manner. The unique components may comprise at least one of: unique identifier (e.g., network address, IP address, MAC address, cloud provider instance identifier, virtualization platform instance identifier, and the like), configuration settings, unique data elements (e.g., cryptographic materials such as one or more multiple private/public key pairs and/or digital certificates), and/or binaries/binary code (e.g., bootloader, operating system component, virtualization platform component, device driver, application, and the like)

With the virtual machine instance 342A ready in the cloud environment (e.g., virtual private cloud 308), the instance in the VPC 308 may communicate directly with the organization network 302 (e.g., cloud orchestrator system 318) in step 1005. The VM instance 342A may notify the organization network 302 that it is initialized (e.g., booted based on a specified protocol) and ready to be unlocked by sending it the second token. The organization network 302 may access the reservation from the internal database, and verify (see step 1105) the authenticity of second token. The virtual machine instance status indicates it is ready to be unlocked. In one example, the notification from the second computing system (e.g., VM instance 342A in VPC 308) to the first computing system (e.g., organization network 302) may indicate that the new virtual machine has been initialized using the appropriate components (e.g., encrypted operating system image template, operating system kernel, and/or initial ramdisk).

In response to validating the properties of the new virtual machine 342A, one or more encrypted channels between a first computing system (e.g., cloud orchestrator system 318 in organization network 302 and/or cloud zone 306) and the new VM instance 342A may be established. A secure (e.g., SSH) connection may be established using communication server software embedded in bootable components, such as those transmitted in step 1010. Unique public-private key pairs (or other confidential information, such as randomly generated user account/password) may be used to allow connection with the VM. In some examples, the confidential information (e.g., passphrases, and the like) may be rotated to increase the security on subsequent restarts. In some examples, the connection (e.g., secure SSH channel) may use mutual authentication by the caller (e.g., device making the request) authenticating the VM instance 342A using some of the confidential information (e.g., public-private key pairs), and the VM authenticating the caller. In addition, in some examples, one or more devices at the first computing system (e.g., cloud orchestrator 318) may be configured to intentionally provide incorrect authentication parameters to verify that the VM 342A will correctly refuse the connection request. Before the first computing takes substantial action after it is connected to the VM 342A, it may perform a host integrity audit and verify various attributes of the VM to confirm it has not been modified or tampered with; by way of mutual authentication, a second audit may be performed later, as described below. Subsequently, the first computing system (e.g., cloud orchestrator system 318 in organization network 302) may deliver confidential information (e.g., passphrases, cryptographic keys, and the like) to the virtual machine 342A in the VPC 308 to unlock the disk to memory as a file, in some examples. The cloud orchestrator system 318 may also transmit (see step 1006) a third token alongside the confidential information. Consequently, the first computing system (e.g., cloud orchestrator system 318 in network 302) may update (see step 1106) the reservation stored in the internal database to record the third token.

In step 1011, the secure cloud zone 306 (e.g., gateway server 1216) may receive the confidential information (e.g., passwords, digital certificates, unique token, and the like) from the virtual machine 342A in the VPC 308. The confidential information may indicate a request by the virtual machine 342A to establish a secure channel via the gateway server 1216 with the first computing system (e.g., network 302). The third token may also accompany the request to create a secure channel. The gateway server 1216 may transmit (see step 1007), over a secure channel, the third token and the request to the first computing system (e.g., cloud orchestrator system 318) in order to confirm authenticity (see step 1107) of the received third token to the reservation. The organization network 302 may access an internal database to retrieve the reservation for the instance, and verify that the confidential information (e.g., unique third token) is correct.

Upon completion of the secure network boot and confirmation of the authenticity of the third token and confidential information, the gateway server 1216 may establish (see step 1111) a secure connection between the first computing system (e.g., network 302) and the virtual machine 342A in the VPC 308. In one example, immediately before or after the secure connection is established, the secure gateway 1216 together with cloud orchestrator 318 and other components may perform a second integrity audit to verify the connected VM instance (e.g., the processes that are running at the VM instance, the files at the VM instances, the disk of the VM). The secure connection may be via the secure cloud zone 306. The virtual machine instance 342A in the cloud environment (e.g., virtual private cloud 308) may then access resources and data stored in the cloud zone 306 and organization network 302, as a result of having been securely instantiating, booted, and authenticated. The VM instance 342A may erase all confidential information and security files, such as public-private key pairs and other files, before finalizing the booting of the instance. The VM instance 342A may re-configure the network settings copied from the operating system template to be specific to this instance.

As an ongoing process, the first computing system (e.g., cloud zone 306 and/or organization network 302) may monitor communications and other information associated with the new virtual machine 342A in the VPC 308, such as, but not limited to the techniques described above, such as monitoring/analysis of logs and other information. In addition, the first computing system may audit the virtual machine, for example by monitoring the instance, as described above.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

What is claimed is:

1. A method comprising:

transmitting, by a first computing system via a secure channel to a second computing system, a request to create a virtual machine in the second computing system, wherein the request includes at least a first token, and wherein the second computing system is a cloud computing system comprising a plurality of pieces of physical infrastructure hardware that provide a virtualization platform;

recording, in a computer memory of the first computing system using a processor of the first computing system, the first token in association with the request for a virtual machine;

receiving, by the first computing system from a server located in a secure zone in the second computing system, the first token after the second computing system requests to load components configured to boot the virtual machine;

confirming, using the processor of the first computing system, authenticity of the received first token with the recorded first token;

transmitting, by the first computing system to the server located in the secure zone in the second computing system, a second token unique to the request to load components, wherein the second token is configured to enable the server located in the secure zone of the second computing system to transmit the requested components and the second token to the virtual machine, wherein the requested components are unique to the request to load components;

recording, in the computer memory using the processor of the first computing system, the second token in association with the request for the virtual machine;

receiving, by the first computing system from the virtual machine, the second token after the virtual machine has been loaded with the requested components on a first piece of physical infrastructure hardware of the plurality of pieces of physical infrastructure hardware that provide the virtualization platform;

confirming, using the processor of the first computing system, authenticity of the received second token with the recorded second token;

transmitting, by the first computing system to the virtual machine, a third token and confidential information configured to enable the virtual machine to create a secure connection with the first computing system via a gateway server located in the secure zone of the second computing system;

recording, in the computer memory using the processor of the first computing system, the third token in association with the request for the virtual machine;

receiving, by the first computing system from the gateway server located in the secure zone of the second computing system, the third token and a request to establish a secure connection through the secure zone with the virtual machine;

confirming, using the processor of the first computing system, authenticity of the received third token with the recorded third token;

recording, using the processor of the first computing system, an entry in a log file stored on the computer memory of the first computing system indicating a duration of time in a boot phase exceeds a predetermined threshold of time;

recording, using the processor of the first computing system, an entry in a log file stored on the computer memory of the first computing system indicating a duration of time in an unlock phase exceeds a predetermined threshold of time; and recording, using the processor of the first computing system, an entry in a log file stored on the computer memory of the first computing system indicating a duration of time in a connect phase exceeds a predetermined threshold of time, wherein the virtual machine is a measured virtual machine, and authenticity of the measured virtual machine is determined by the first computing system for at least one tenant of a cloud provider associated with the cloud computing system using a quote generated based on a measurement of the measured virtual machine, and wherein the quote is uniquely tied to the first piece of physical infrastructure hardware of the plurality of pieces of physical infrastructure hardware that provide the virtualization platform, and the cloud provider creates an association between a trusted protection module (TPM) associated with the measured virtual machine and the generated quote, the association between the TPM and the generated quote identifying to the at least one tenant of the cloud provider the first piece of physical infrastructure of the plurality of pieces of physical infrastructure hardware on which the measured virtual machine has been loaded.

2. The method of claim 1, wherein a duration of time in a create phase exceeds a predetermined threshold of time, and wherein the method further comprises:

recording, using the processor of the first computing system, an entry in a log file stored on the computer memory of the first computing system, wherein the create phase starts at the recording, by the first computing system, of the first token, and the create phase ends with the receiving, by the first computing system, of the first token from the server located in the secure zone in the second computing system.

3. The method of claim 2, further comprising:
sending, to the second computing system, instructions to abort the request to create the virtual machine.

4. The method of claim 1, further comprising:
confirming, using the processor of the first computing system, authenticity of the components loaded in the virtual machine.

5. The method of claim 1, wherein the first computing system comprises a cloud orchestrator, and the second computing system comprises a virtual private cloud.

6. The method of claim 1, wherein the components configured to boot the virtual machine comprise an operating system kernel and an initial ramdisk.

7. The method of claim 1, wherein the components further comprise at least one of: communications server software components and host integrity detection software components.

8. The method of claim 1, wherein the first token is recorded in association with a reservation comprising unique data elements.

9. The method of claim 8, wherein the first token is a randomly generated, unique, one-time use token.

10. The method of claim 1, wherein the first token, second token, third token, and confidential information are each randomly generated for one-time use.

11. The method of claim 1, wherein the first computing system is associated with an organization and the second computing system is associated with a cloud service provider that provides cloud computing services to the organization.

12. A first computing system comprising:
at least one processor; and
at least one memory storing computer executable instructions that, when executed by the at least one processor, cause the first computing system to:
transmit, via a secure channel to a second computing system, a request to create a virtual machine in the second computing system, wherein the request includes at least a first token, and wherein the second computing system is a cloud computing system comprising a plurality of pieces of physical infrastructure hardware that provide a virtualization platform;
record the first token in association with the request for a virtual machine;
receive, from a server located in a secure zone in the second computing system, the first token after the second computing system requests to load components configured to boot the virtual machine;
confirm authenticity of the received first token with the recorded first token;
transmit, to the server located in the secure zone in the second computing system, a second token unique to the request to load components, wherein the second token is configured to enable the server located in the secure zone of the second computing system to transmit the requested components and the second token to the virtual machine, wherein the requested components are unique to the request to load components;
record the second token in association with the request for the virtual machine;
receive, from the virtual machine, the second token after the virtual machine has been loaded with the requested components on a first piece of physical infrastructure hardware of the plurality of pieces of physical infrastructure hardware that provide the virtualization platform;
confirm authenticity of the received second token with the recorded second token;
transmit, to the virtual machine, a third token and confidential information configured to enable the virtual machine to create a secure connection with the first computing system via a gateway server located in the secure zone of the second computing system;
record the third token in association with the request for the virtual machine;
receive, from the gateway server located in the secure zone of the second computing system, the third token and a request to establish a secure connection through the secure zone with the virtual machine;
confirm authenticity of the received third token with the recorded third token;
record an entry in a log file stored on the at least one memory of the first computing system indicating a duration of time in a boot phase exceeds a predetermined threshold of time;
record an entry in a log file stored on the at least one memory of the first computing system indicating a duration of time in an unlock phase exceeds a predetermined threshold of time; and record an entry in a log file stored on the at least one memory of the first computing system indicating a duration of time in a connect phase exceeds a predetermined threshold of time, wherein the virtual machine is a measured virtual machine, and authenticity of the measured virtual machine is determined by the first computing system for at least one tenant of a cloud provider associated with the cloud computing system using a quote generated based on a measurement of the measured virtual machine, and wherein the quote is uniquely tied to the first piece of physical infrastructure hardware of the plurality of pieces of physical infrastructure hardware that provide the virtualization platform, and the cloud provider creates an association between a trusted protection module (TPM) associated with the measured virtual machine and the generated quote, the association between the TPM and the generated quote identifying to the at least one tenant of the cloud provider the first piece of physical infrastructure of the plurality of pieces of physical infrastructure hardware on which the measured virtual machine has been loaded.

13. The first computing system of claim 12, wherein a duration of time in a create phase exceeds a predetermined threshold of time, wherein the at least one memory stores additional computer executable instructions that, when executed by the at least one processor, further cause the first computing system to record an entry in a log file stored on the computer memory of the first computing system, and wherein the create phase starts at the recording of the first token, and the create phase ends with the receiving of the first token from the server located in the secure zone in the second computing system.

14. The first computing system of claim 13, wherein the at least one memory stores additional computer executable instructions that, when executed by the at least one processor, further cause the first computing system to:

send, to the second computing system, instructions to abort the request to create the virtual machine.

15. The first computing system of claim 12, wherein the at least one memory stores additional computer executable instructions that, when executed by the at least one processor, further cause the first computing system to:

confirm authenticity of the components loaded in the virtual machine.

16. The first computing system of claim 12, wherein the first computing system comprises a cloud orchestrator, and the second computing system comprises a virtual private cloud.

17. The first computing system of claim 12, wherein the components configured to boot the virtual machine comprise an operating system kernel and an initial ramdisk.

18. The first computing system of claim 12, wherein the components further comprise at least one of: communications server software components and host integrity detection software components.

19. The first computing system of claim 12, wherein the first token is recorded in association with a reservation comprising unique data elements.

20. The first computing system of claim 19, wherein the first token is a randomly generated, unique, one-time use token.

21. The first computing system of claim 12, wherein the first token, second token, third token, and confidential information are each randomly generated for one-time use.

22. The first computing system of claim 12, wherein the first computing system is associated with an organization and the second computing system is associated with a cloud service provider that provides cloud computing services to the organization.

23. A non-transitory computer-readable storage medium storing computer-executable instructions, which when executed by a first computing system having at least one processor and at least one memory, cause the first computing system to:

transmit, via a secure channel to a second computing system, a request to create a virtual machine in the second computing system, wherein the request includes at least a first token, and wherein the second computing system is a cloud computing system comprising a plurality of pieces of physical infrastructure hardware that provide a virtualization platform;

record the first token in association with the request for a virtual machine;

receive, from a server located in a secure zone in the second computing system, the first token after the second computing system requests to load components configured to boot the virtual machine;

confirm authenticity of the received first token with the recorded first token;

transmit, to the server located in the secure zone in the second computing system, a second token unique to the request to load components, wherein the second token is configured to enable the server located in the secure zone of the second computing system to transmit the requested components and the second token to the virtual machine, wherein the requested components are unique to the request to load components;

record the second token in association with the request for the virtual machine;

receive, from the virtual machine, the second token after the virtual machine has been loaded with the requested components on a first piece of physical infrastructure hardware of the plurality of pieces of physical infrastructure hardware that provide the virtualization platform;

confirm authenticity of the received second token with the recorded second token;

transmit, to the virtual machine, a third token and confidential information configured to enable the virtual machine to create a secure connection with the first computing system via a gateway server located in the secure zone of the second computing system;

record the third token in association with the request for the virtual machine;

receive, from the gateway server located in the secure zone of the second computing system, the third token and a request to establish a secure connection through the secure zone with the virtual machine;

confirm authenticity of the received third token with the recorded third token;

record an entry in a log file stored on the at least one memory of the first computing system indicating a duration of time in a boot phase exceeds a predetermined threshold of time;

record an entry in a log file stored on the at least one memory of the first computing system indicating a duration of time in an unlock phase exceeds a predetermined threshold of time; and record an entry in a log file stored on the at least one memory of the first computing system indicating a duration of time in a connect phase exceeds a predetermined threshold of time, wherein the virtual machine is a measured virtual machine, and authenticity of the measured virtual machine is determined by the first computing system for at least one tenant of a cloud provider associated with the cloud computing system using a quote generated based on a measurement of the measured virtual machine, and wherein the quote is uniquely tied to the first piece of physical infrastructure hardware of the plurality of pieces of physical infrastructure hardware that provide the virtualization platform, and the cloud provider creates an association between a trusted protection module (TPM) associated with the measured virtual machine and the generated quote, the association between the TPM and the generated quote identifying to the at least one tenant of the cloud provider the first piece of physical infrastructure of the plurality of pieces of physical infrastructure hardware on which the measured virtual machine has been loaded.

24. The non-transitory computer-readable storage medium of claim 23, wherein a duration of time in a create phase exceeds a predetermined threshold of time, wherein the non-transitory computer-readable storage medium has additional computer-executable instructions stored thereon that, when executed by the first computing system, further cause the first computing system to record an entry in a log file stored on the computer memory of the first computing system, and wherein the create phase starts at the recording of the first token, and the create phase ends with the receiving of the first token from the server located in the secure zone in the second computing system.

25. The non-transitory computer-readable storage medium of claim 24, having additional computer-executable instructions stored thereon that, when executed by the first computing system, further cause the first computing system to:
send, to the second computing system, instructions to abort the request to create the virtual machine.

26. The non-transitory computer-readable storage medium of claim 23, having additional computer-executable instructions stored thereon that, when executed by the first computing system, further cause the first computing system to:
confirm authenticity of the components loaded in the virtual machine.

27. The non-transitory computer-readable storage medium of claim 23, wherein the first computing system comprises a cloud orchestrator, and the second computing system comprises a virtual private cloud.

28. The non-transitory computer-readable storage medium of claim 23, wherein the components configured to boot the virtual machine comprise an operating system kernel and an initial ramdisk.

29. The non-transitory computer-readable storage medium of claim 23, wherein the components further comprise at least one of: communications server software components and host integrity detection software components.

30. The non-transitory computer-readable storage medium of claim 23, wherein the first token is recorded in association with a reservation comprising unique data elements.

31. The non-transitory computer-readable storage medium of claim 30, wherein the first token is a randomly generated, unique, one-time use token.

32. The non-transitory computer-readable storage medium of claim 23, wherein the first token, second token, third token, and confidential information are each randomly generated for one-time use.

33. The non-transitory computer-readable storage medium of claim 23, wherein the first computing system is associated with an organization and the second computing system is associated with a cloud service provider that provides cloud computing services to the organization.

* * * * *